United States Patent
Yukawa et al.

(10) Patent No.: US 10,081,693 B2
(45) Date of Patent: *Sep. 25, 2018

(54) RETARDATION MATERIAL-FORMING RESIN COMPOSITION, ORIENTATION MATERIAL, AND RETARDATION MATERIAL

(71) Applicant: NISSAN CHEMICAL INDUSTRIES, LTD., Tokyo (JP)

(72) Inventors: Shojiro Yukawa, Funabashi (JP); Jun Ito, Funabashi (JP); Kohei Goto, Funabashi (JP); Yuta Kanno, Funabashi (JP); Hiroyuki Omura, Funabashi (JP); Tadashi Hatanaka, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/122,277

(22) PCT Filed: Feb. 27, 2015

(86) PCT No.: PCT/JP2015/055969
§ 371 (c)(1),
(2) Date: Aug. 29, 2016

(87) PCT Pub. No.: WO2015/129889
PCT Pub. Date: Sep. 3, 2015

(65) Prior Publication Data
US 2016/0369025 A1 Dec. 22, 2016

(30) Foreign Application Priority Data
Feb. 28, 2014 (JP) ................. 2014-039699
Jul. 8, 2014 (JP) ................. 2014-140946

(51) Int. Cl.
| | | |
|---|---|---|
| C08F 220/64 | (2006.01) | |
| G02F 1/1337 | (2006.01) | |
| C08F 2/38 | (2006.01) | |
| C08F 220/20 | (2006.01) | |
| G02B 1/04 | (2006.01) | |
| G02B 5/30 | (2006.01) | |
| C08F 120/58 | (2006.01) | |
| C08F 212/08 | (2006.01) | |
| C08F 220/14 | (2006.01) | |
| C08F 220/58 | (2006.01) | |
| C08L 25/14 | (2006.01) | |
| C08L 33/02 | (2006.01) | |
| G02F 1/13363 | (2006.01) | |

(Continued)

(52) U.S. Cl.
CPC ............. *C08F 220/64* (2013.01); *C08F 2/38* (2013.01); *C08F 120/58* (2013.01); *C08F 212/08* (2013.01); *C08F 220/14* (2013.01); *C08F 220/20* (2013.01); *C08F 220/58* (2013.01); *C08L 25/14* (2013.01); *C08L 33/02* (2013.01); *G02B 1/04* (2013.01); *G02B 5/3083* (2013.01); *G02F 1/13363* (2013.01); *G02F 1/133711* (2013.01); *G02F 1/133788* (2013.01); *C08F 220/36* (2013.01); *C08F 2222/1013* (2013.01); *C08F 2222/1026* (2013.01); *G02B 1/08* (2013.01); *G02F 2001/133631* (2013.01); *G02F 2001/133635* (2013.01)

(58) Field of Classification Search
CPC .......... G02B 1/04; G02B 5/3083; G02B 1/08; C08L 33/08; C08L 33/02; C08L 25/14; G02F 1/133788; G02F 1/133711; G02F 1/13363; G02F 2001/133631; G02F 220/36; G02F 2001/133635; C08F 2/38; C08F 220/20; C08F 220/64; C08F 220/58; C08F 220/14; C08F 120/58; C08F 212/08; C08F 2222/1013; C08F 2222/1026

See application file for complete search history.

(56) References Cited

U.S. PATENT DOCUMENTS

| | | | | |
|---|---|---|---|---|
| 6,107,427 A | * | 8/2000 | Herr et al. ............. | C07C 69/92 526/319 |
| 2012/0114879 A1 | * | 5/2012 | Hatanaka et al. .... | C08L 33/066 428/1.2 |

(Continued)

FOREIGN PATENT DOCUMENTS

| | | |
|---|---|---|
| JP | H10-232365 A | 9/1998 |
| JP | 2001-517719 A | 10/2001 |

(Continued)

OTHER PUBLICATIONS

Apr. 28, 2015 Search Report issued in International Patent Application No. PCT/JP2015/055969.

(Continued)

*Primary Examiner* — Nathan M Nutter
(74) *Attorney, Agent, or Firm* — Oliff PLC

(57) ABSTRACT

A retardation material-forming resin composition for providing an orientation material that has high photoreaction efficiency and with which a polymerizable liquid crystal can be aligned in a highly sensitive manner. A retardation material-forming resin composition being thermally curable wherein including a resin (component (A)) having a photo-aligning group to which a thermally reactive moiety is bonded directly or connected via a linking group; an orientation material obtained by use of the composition, and a retardation material formed by use of a cured film obtained from the composition.

18 Claims, No Drawings

(51) Int. Cl.
     *C08F 220/36*     (2006.01)
     *C08F 222/10*     (2006.01)
     *G02B 1/08*     (2006.01)

(56)            References Cited

U.S. PATENT DOCUMENTS

2015/0275091 A1*  10/2015  Hatanaka et al.  ...... C08L 33/04
                                                                           525/172
2016/0369105 A1*  12/2016  Ito et al.  ........... G02F 1/133788

FOREIGN PATENT DOCUMENTS

| JP | 3611342 B2 | 1/2005 |
|---|---|---|
| JP | 2005-049865 A | 2/2005 |
| JP | 2005-326439 A | 11/2005 |
| JP | 2009-058584 A | 3/2009 |
| JP | 2009-173792 A | 8/2009 |
| JP | 2014-012823 A | 1/2014 |
| WO | 2011/010635 A1 | 1/2011 |
| WO | 2014/017497 A1 | 1/2014 |

OTHER PUBLICATIONS

Apr. 28, 2015 Written Opinion issued in International Patent Application No. PCT/JP2015/055969.

* cited by examiner ic resin and a polyimide resin, for example, are known having
RETARDATION MATERIAL-FORMING RESIN COMPOSITION, ORIENTATION MATERIAL, AND RETARDATION MATERIAL

TECHNICAL FIELD

The present invention relates to a retardation material-forming resin composition, an orientation material, and a retardation material.

BACKGROUND ART

Recently, in the field of displays such as televisions including liquid crystal panels, 3D displays with which 3D images can be enjoyed have been developed in order to enhance performance. In such 3D displays, a stereoscopic image can be displayed by, for example, making the right eye of a viewer visually recognize an image for the right eye and making the left eye of the viewer visually recognize an image for the left eye.

Various 3D display methods for displaying 3D images can be used, and examples of the methods known as methods requiring no special eyeglasses include a lenticular lens method and a parallax barrier method.

As one of display methods for viewers to see 3D images with eyeglasses, a circularly polarized glasses method, for example, is known (see Patent Document 1, for example).

In a 3D display using the circularly polarized light glasses method, a retardation material is generally arranged on a display element for forming an image of a liquid crystal panel and the like. In this retardation material, two types of retardation regions having different retardation characteristics are regularly arranged each in plurality to constitute a retardation material that is patterned. In the present specification, a retardation material thus patterned in which a plurality of retardation regions having different retardation characteristics are arranged is called a patterned retardation material hereinafter.

The patterned retardation material can be fabricated by optically patterning a retardation substance including a polymerizable liquid crystal as described in Patent Document 2, for example. In the optical patterning of the retardation substance including a polymerizable liquid crystal, a photo-alignment technique known for forming an orientation material for a liquid crystal panel is used. More specifically, a coating made of a material having photo-alignment properties is provided on a substrate, and two types of polarized beams the polarization directions of which are different from each other are radiated on this coating. Thus, a photo-alignment film is obtained as an orientation material in which two types of liquid crystal alignment regions are formed and the directions of alignment control of liquid crystals in the regions are different from each other. Onto this photo-alignment film, a retardation substance containing a polymerizable liquid crystal in a solution state is applied to perform alignment of the polymerizable liquid crystal. Subsequently, the polymerizable liquid crystal thus aligned is cured to form a patterned retardation material.

As materials having photo-alignment properties that can be used in orientation material formation using a photo-alignment technique for liquid crystal panels, an acrylic resin and a polyimide resin, for example, are known having in a side chain thereof a photodimerized moiety such as cinnamoyl group and chalcone group, for example. It is reported that these resins exhibit a property of controlling alignment of liquid crystals (hereinafter, also called liquid crystal alignment properties) by polarized UV irradiation (see Patent Document 3 to Patent Document 5).

PRIOR-ART DOCUMENTS

Patent Documents

Patent Document 1: Japanese Patent Application Publication No. 10-232365 (JP H10-232365 A)
Patent Document 2: Japanese Patent Application Publication No. 2005-49865 (JP 2005049865 A)
Patent Document 3: Japanese Patent No. 3611342 (JP 3611342 B2)
Patent Document 4: Japanese Patent Application Publication No. 2009-058584 (JP 2009-058584 A)
Patent Document 5: Published Japanese Translation of PCT Application No. 2001-517719 (JP 2001-517719 A)

SUMMARY OF THE INVENTION

Problem to be Solved by the Invention

However, according to the study by the inventors of the present invention, such acrylic resins having in a side chain thereof a photodimerized moiety such as cinnamoyl group and chalcone group do not provide sufficient properties when the acrylic resins are used for formation of a retardation material. In particular, to irradiate these resins with polarized UV light to form an orientation material and optically pattern a retardation substance including a polymerizable liquid crystal using the orientation material, a large exposure amount of polarized UV light is necessary. This makes the exposure amount of the polarized UV light much larger than the exposure amount (e.g., about 30 mJ/cm$^2$) of polarized UV light sufficient to align a liquid crystal for a general liquid crystal panel.

A cause of the larger exposure amount of the polarized UV light is that, in formation of a retardation material, a polymerizable liquid crystal in a state of solution is used to be applied onto an orientation material differently from the case of a liquid crystal for a liquid crystal panel.

When an acrylic resin having in a side chain thereof a photodimerized moiety such as cinnamoyl group, for example, is used to form an orientation material, thereby aligning the polymerizable liquid crystal, in such an acrylic resin, photocrosslinking by photodimerization reaction is performed. This requires irradiation with polarized light in a large exposure amount until the resistance to the polymerizable liquid crystal solution appears. In order to align a liquid crystal of a liquid crystal panel, only the surface of an orientation material with photo-alignment properties generally needs to be subjected to dimerization reaction. However, in order for an orientation material to have solvent resistance when a conventional material such as the acrylic resin is used, the orientation material needs to be caused to react to the inside thereof, which requires a larger exposure amount. Consequently, the alignment sensitivity of the conventional material is significantly reduced disadvantageously.

A technique is known in which a cross-linking agent is added to the resin of the conventional material such that the resin has such solvent resistance. However, it is known that a three-dimensional structure is formed inside a coating film that is formed after heat-curing reaction with a cross-linking agent is performed, whereby the photoreactivity is reduced. In other words, the alignment sensitivity is significantly reduced, and even if a conventional material to which the cross-linking agent is added is used, a desired effect cannot be obtained.

In view of the foregoing, a photo-alignment technique that can improve the alignment sensitivity of an orientation material to reduce the exposure amount of polarized UV light and a retardation material-forming resin composition that is used to form the orientation material are desired. A technique is also desired that can efficiently provide a patterned retardation material.

The present invention has been made based on the above-described findings and study results. An object of the present invention is to provide a retardation material-forming resin composition for providing an orientation material that has high photoreaction efficiency and with which a polymerizable liquid crystal can be aligned in a highly sensitive manner.

Another object of the present invention is to provide an orientation material that is formed of the retardation material-forming resin composition, has high photoreaction efficiency, and also has solvent resistance and adhesion durability, and with which a polymerizable liquid crystal can be aligned in a highly sensitive manner, and to provide a retardation material that is formed of the orientation material.

The other objects and advantages of the present invention will be apparent from the following description.

Means for Solving the Problem

A first aspect of the present invention relates to a retardation material-forming resin composition being thermally curable and characterized by comprising a resin [component (A)] having a photo-aligning group to which a thermally reactive moiety is bonded directly or connected via a linking group.

In the first aspect of the present invention, the photo-aligning group is preferably an organic group including a structure of Formula (1):

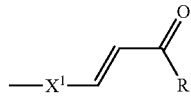

(1)

(in the Formula, R is a hydroxy group or an amino group; and $X^1$ is a phenylene group that is optionally substituted with an optional substituent).

In the first aspect of the present invention, the resin of the component (A) is preferably an acrylic copolymer.

In the first aspect of the present invention, the resin of the component (A) preferably further has a self-crosslinking group, or further has a group that reacts with at least one group A selected from the group consisting of hydroxy group, carboxy group, amide group, amino group, an alkoxysilyl group, and a group of Formula (2) [when an end portion of the photo-aligning group in the resin is carboxy group or amide group, this end portion is also included in the group A]:

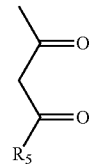

(2)

(in the Formula, $R_5$ is an alkyl group, an alkoxy group, or a phenyl group).

In the first aspect of the present invention, the resin of the component (A) preferably further has at least one group A selected from the group consisting of hydroxy group, carboxy group, amide group, amino group, an alkoxysilyl group, and a group of Formula (2) [when an end portion of the photo-aligning group in the resin is carboxy group or amide group, this end portion is also included in the group A], and the composition preferably further includes a cross-linking agent (B) that reacts with the at least one group A:

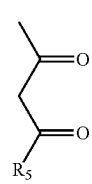

(2)

(in the Formula, $R_5$ is an alkyl group, an alkoxy group, or a phenyl group).

In the first aspect of the present invention, the resin of the component (A) preferably further has a group that reacts with at least one group A selected from the group consisting of hydroxy group, carboxy group, amide group, amino group, an alkoxysilyl group, and a group of Formula (2) [when an end portion of the photo-aligning group in the resin is carboxy group or amide group, this end portion is also included in the group A], and the at least one group A:

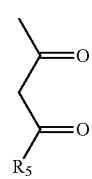

(2)

(in the Formula, $R_5$ is an alkyl group, an alkoxy group, or a phenyl group).

In the first aspect of the present invention, the retardation material-forming resin composition preferably further comprises, as a component (C), a compound having at least two groups A selected from the group consisting of hydroxy group, carboxy group, amide group, amino group, an alkoxysilyl group, and a group of Formula (2).

In the first aspect of the present invention, the retardation material-forming resin composition preferably further comprises a cross-linking catalyst as a component (D).

In the first aspect of the present invention, the retardation material-forming resin composition preferably further comprises, as a component (E): a compound having one or more polymerizable groups and at least one group A selected from the group consisting of hydroxy group, carboxy group, amide group, amino group, an alkoxysilyl group, and a group of Formula (2), or one or more groups that react with the at least one group A.

In the first aspect of the present invention, the retardation material-forming resin composition preferably further comprises, as a component (F), a monomer having a photo-aligning group to which a thermally reactive moiety is bonded directly or connected via a linking group and one or more polymerizable groups.

A second aspect of the present invention relates to an orientation material characterized by being obtained with the retardation material-forming resin composition of the first aspect of the present invention.

A third aspect of the present invention relates to a retardation material characterized by being formed with a cured film that is obtained from the retardation material-forming resin composition of the first aspect of the present invention.

A fourth aspect of the present invention relates to a thermally cured-film formation composition characterized by comprising a resin [component (A)] having a photo-aligning group to which a thermally reactive moiety is bonded directly or connected via a linking group.

In the fourth aspect of the present invention, the photo-aligning group is preferably an organic group including a structure of Formula (1):

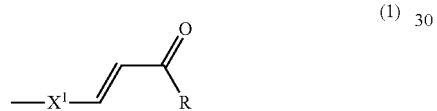

(in the Formula, R is a hydroxy group or an amino group; and $X^1$ is a phenylene group that is optionally substituted with an optional substituent).

In the fourth aspect of the present invention, the resin of the component (A) is preferably an acrylic copolymer.

In the fourth aspect of the present invention, the resin of the component (A) preferably further has a self-crosslinking group, or further has a group that reacts with at least one group A selected from the group consisting of hydroxy group, carboxy group, amide group, amino group, an alkoxysilyl group, and a group of Formula (2) [when an end portion of the photo-aligning group in the resin is carboxy group or amide group, this end portion is also included in the group A]:

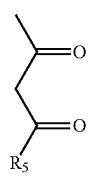

(in the Formula, $R_5$ is an alkyl group, an alkoxy group, or a phenyl group).

In the fourth aspect of the present invention, the resin of the component (A) preferably further has at least one group A selected from the group consisting of hydroxy group, carboxy group, amide group, amino group, an alkoxysilyl group, and a group of Formula (2) [when an end portion of the photo-aligning group in the resin is carboxy group or amide group, this end portion is also included in the group A], and the composition preferably further includes a cross-linking agent (B) that reacts with the at least one group A:

(in the Formula, $R_5$ is an alkyl group, an alkoxy group, or a phenyl group).

In the fourth aspect of the present invention, the resin of the component (A) preferably further has a group that reacts with at least one group A selected from the group consisting of hydroxy group, carboxy group, amide group, amino group, an alkoxysilyl group, and a group of Formula (2) [when an end portion of the photo-aligning group in the resin is carboxy group or amide group, this end portion is also included in the group A], and the at least one group A:

(in the Formula, $R_5$ is an alkyl group, an alkoxy group, or a phenyl group).

In the fourth aspect of the present invention, the thermally cured-film formation composition preferably further comprises, as a component (C), a compound having at least two groups A selected from the group consisting of hydroxy group, carboxy group, amide group, amino group, an alkoxysilyl group, and a group of Formula (2).

A fifth aspect of the present invention relates to a cured film characterized by being obtained with the thermally cured-film formation composition of the fourth aspect of the present invention.

Effects of the Invention

According to the first aspect of the present invention, a retardation material-forming resin composition that has excellent adhesion, alignment sensitivity, pattern formability, and adhesion durability and can form an orientation material with which a polymerizable liquid crystal can be aligned even on a resin film in a highly sensitive manner can be provided.

According to the second aspect of the present invention, an orientation material that has excellent adhesion, alignment sensitivity, pattern formability, and adhesion durability, and with which a polymerizable liquid crystal can be aligned in a highly sensitive manner can be provided.

According to the third aspect of the present invention, a retardation material that can be efficiently formed and optically patterned even on a resin film can be provided.

According to the fourth aspect of the present invention, a thermally cured-film formation composition that can form a cured film having high transparency, high solvent resistance, high heat resistance, and also liquid crystal alignment capability by light irradiation (photo-alignment properties) can be provided.

According to the fifth aspect of the present invention, a cured film having high transparency, high solvent resistance, high heat resistance, and also liquid crystal alignment capability by light irradiation (photo-alignment properties) can be provided.

MODES FOR CARRYING OUT THE INVENTION

<Retardation Material-Forming Resin Composition>

A retardation material-forming resin composition of the present invention is used to form a thermally cured film having photo-alignment properties, and contains a component having a photo-alignment moiety and a moiety for thermal cross-linking. A photo-aligning group is characterized by being a specific photo-aligning group, that is, a photo-aligning group to which a thermally reactive moiety is bonded directly or connected via a linking group.

As for the specific photo-aligning group, for example, when the photo-aligning group is a cinnamic acid residue, the cinnamic acid residue has carboxy group that is a thermally cross-linking group as a part of the residue. When a thermally cross-linking group forms a part of a photoreactive group in this manner also, the photoreactive group can be included in the specific photo-aligning group in the composition of the present invention.

In the present invention, only any one component in the composition needs to have both of the group A and a group that reacts with the group A as the moiety for thermal cross-linking, or only any one component in the composition including a resin of a component (A) needs to have a moiety that self-crosslinks by heat. Thus, the retardation material-forming resin composition of the present invention contains a resin having the specific photo-aligning group as the component (A), that is, a photo-aligning group to which a thermally reactive moiety is bonded directly or connected via a linking group, and further contains a thermally cross-linking system.

As one aspect of the present invention, examples include a composition that contains the resin having the specific photo-aligning group as the component (A) and, as a component (B), a cross-linking agent that reacts with the thermally reactive moiety connected to the specific photo-aligning group. In this case, the resin of the component (A) only needs to have, as a thermally reactive moiety, the thermally reactive moiety in the specific photo-aligning group.

As one aspect of the present invention, examples include a composition in which the resin of the component (A) is a copolymer with a monomer having the group A, and that contains, as the component (B), a cross-linking agent that thermally reacts with the group A.

As one aspect of the present invention, examples include a composition that further contains a self-crosslinking group as a thermally cross-linking system in the resin of the component (A).

As one aspect of the present invention, examples include a composition that further contains a group that reacts with a thermally reactive moiety connected to the specific photo-aligning group, as the thermally cross-linking system in the resin of the component (A).

The retardation material-forming resin composition of the present invention may contain a cross-linking agent as the component (B) in addition to the component (A). Furthermore, in addition to the component (A) and the component (B), the retardation material-forming resin composition of the present invention may further contain: as a component (C), a compound having at least two groups A selected from the group consisting of hydroxy group, carboxy group, amide group, amino group, an alkoxysilyl group, and a group of Formula (2); a cross-linking catalyst as a component (D); as a component (E), a compound having one or more polymerizable groups and at least one group A selected from the group consisting of hydroxy group, carboxy group, amide group, amino group, an alkoxysilyl group, and a group of Formula (2), or one or more groups that react with the at least one group A; and as a component (F), a monomer having a photo-aligning group to which a thermally reactive moiety is bonded directly or connected via a linking group and one or more polymerizable groups.

(2)

(In the Formula, $R_5$ is an alkyl group, an alkoxy group, or a phenyl group.)

The retardation material-forming resin composition of the present invention may contain other additives as long as the effects of the present invention are not impaired.

Details of each component will be described below.

<Component (A)>

The component (A) contained in the retardation material-forming resin composition of the present invention is a resin having a photo-aligning group to which a thermally reactive moiety is bonded directly or connected via a linking group (hereinafter, also simply called "photo-aligning group").

Examples of a structural moiety that the resin of the component (A) may have as a thermally reactive moiety include carboxy group, amide group, an N-substituted amide group, hydroxy group, amino group, an alkoxysilyl group, and a group of Formula (2). Among them, the carboxy group and the amide group are preferred.

The photo-aligning group is a functional group of a structural moiety to be photodimerized or photoisomerized.

The structural moiety to be photodimerized contained as the photo-aligning group in the resin of the component (A) is a moiety that forms a dimer by irradiation with light, and specific examples thereof include cinnamoyl group, chalcone group, coumarin group, and anthracene group. Among them, in terms of high transparency in the visible light range and high photodimerization reactivity, the cinnamoyl group is preferred.

The structural moiety to be photoisomerized contained as the photo-aligning group in the resin of the component (A) is a structural moiety that is converted into a cis form or a trans form by irradiation with light, and specific examples thereof include a moiety containing an azobenzene structure and a moiety containing stilbene structure. Among them, in terms of high reactivity, the azobenzene structure is preferred.

The thermally reactive moiety is bonded directly to or connected via a linking group to the photo-aligning group, and such a linking group is a divalent group selected from a linear alkylene group having a carbon atom number of 1 to 15, a branched alkylene group having a carbon atom number of 3 to 20, a cyclic alkylene group having a carbon atom number of 3 to 20, and phenylene group, or a group formed by bonding together a plurality of such divalent groups. In this case, bonding between the divalent groups forming the linking group and bonding between the linking group and the thermally reactive moiety are achieved by a single bond, an ester bond, an amide bond, a urea bond, or an ether bond. When the divalent group is formed in plurality, the divalent groups may be identical to or different from each other, and when such bonding is achieved by a plurality of bonds, the bonds may be identical to or different from each other.

Examples of the linear alkylene group having a carbon atom number of 1 to 15 include methylene group, ethylene group, n-propylene group, n-butylene group, n-pentylene group, n-hexylene group, n-heptylene group, n-octylene group, n-nonylene group, n-decylene group, n-undecylene group, n-dodecylene group, n-tridecylene group, n-tetradecylene group, and n-pentadecylene group.

Examples of the branched alkylene group having a carbon atom number of 3 to 20 include i-propylene group, i-butylene group, s-butylene group, t-butylene group, 1-methyl-n-butylene group, 2-methyl-n-butylene group, 3-methyl-n-butylene group, 1,1-dimethyl-n-propylene group, 1,2-dimethyl-n-propylene group, 2,2-dimethyl-n-propylene group, 1-ethyl-n-propylene group, 1-methyl-n-pentylene group, 2-methyl-n-pentylene group, 3-methyl-n-pentylene group, 4-methyl-n-pentylene group, 1,1-dimethyl-n-butylene group, 1,2-dimethyl-n-butylene group, 1,3-dimethyl-n-butylene group, 2,2-dimethyl-n-butylene group, 2,3-dimethyl-n-butylene group, 3,3-dimethyl-n-butylene group, 1-ethyl-n-butylene group, 2-ethyl-n-butylene group, 1,1,2-trimethyl-n-propylene group, 1,2,2-trimethyl-n-propylene group, 1-ethyl-1-methyl-n-propylene group, and 1-ethyl-2-methyl-n-propylene group, and also an alkylene group that is branched at an optional position within a range of up to $C_{20}$.

Examples of the cyclic alkylene group having a carbon atom number of 3 to 20 include monocyclic alkylene groups such as cyclopropylene group, cyclobutylene group, cyclopentylene group, cyclohexylene group, cycloheptylene group, and cyclooctylene group; and polycyclic alkylene groups such as norbornylene group, tricyclodecylene group, tetracyclododecylene group, and adamantylene group.

The resin of the component (A) is preferably an acrylic copolymer.

In the component (A), the photo-aligning group to which a thermally reactive moiety is bonded directly or connected via a linking group is preferably an organic group, for example, including a structure of Formula (1):

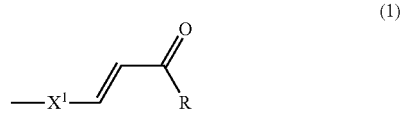

(1)

(in the Formula, R is a hydroxy group, an amino group, a hydroxyphenoxy group, a carboxyphenoxy group, an aminophenoxy group, an aminocarbonyl phenoxy group, a phenylamino group, a hydroxy phenylamino group, a carboxy phenylamino group, an amino phenylamino group, a hydroxy alkyl amino group, or a bis(hydroxyalkyl)amino group; and $X^1$ is a phenylene group that is optionally substituted with an optional substituent, in which a benzene ring in the definition of these substituents is optionally substituted with a substituent).

Although the optional substituent is not limited to a particular substituent, examples thereof include alkyl groups such as methyl group, ethyl group, propyl group, butyl group, and isobutyl group; haloalkyl groups such as trifluoromethyl group; alkoxy groups such as methoxy group and ethoxy group; halogen atoms such as iodine, bromine, chlorine, and fluorine; cyano group; and nitro group.

Examples of the substituent with which a benzene ring is optionally substituted include alkyl groups such as methyl group, ethyl group, propyl group, butyl group, and isobutyl group; haloalkyl groups such as trifluoromethyl group; alkoxy groups such as methoxy group and ethoxy group; halogen atoms such as iodine, bromine, chlorine, and fluorine; cyano group; and nitro group.

In the R, hydroxy group or amino group is preferred, and the hydroxy group is particularly preferred.

The component (A) is preferably a resin in which the organic group including the structure of Formula (1) binds to the main chain via a spacer. The spacer is a divalent group selected from a linear alkylene group with a carbon atom number of 1 to 15, a branched alkylene group having a carbon atom number of 3 to 20, a cyclic alkylene group having a carbon atom number of 3 to 20, and phenylene group, or a group formed by bonding together a plurality of such divalent groups. In this case, bonding between the divalent groups forming the spacer, bonding between the spacer and the polymerizable group, and bonding between the spacer and the group of Formula (1) are achieved by a single bond, an ester bond, an amide bond, a urea bond, or an ether bond. When the divalent group is formed in plurality, the divalent groups may be identical to or different from each other, and when such bonding is achieved by a plurality of bonds, the bonds may be identical to or different from each other.

Specific examples of each of the linear alkylene group having a carbon atom number of 1 to 15, the branched alkylene group having a carbon atom number of 3 to 20, and the cyclic alkylene group having a carbon atom number of 3 to 20 have been described (supra).

Among them, the component (A) is preferably a resin having a photo-aligning group of Formula (1) in which R is a hydroxy group or an amino group and $X^1$ is a phenylene group that is optionally substituted with an optional substituent, and more preferably an acrylic copolymer having the photo-aligning group.

In the present invention, the acrylic copolymer is a polymer that is obtained by using a monomer having an unsaturated double bond such as an acrylic acid ester, a methacrylic acid ester, and styrene for homopolymerization or copolymerization. Thus, in addition to the acrylic copolymer, an acrylic polymer is categorized in the "acrylic copolymer" in the present invention.

The acrylic copolymer having the photo-aligning group (hereinafter, also called "specific copolymer") only needs to be an acrylic copolymer having such a structure, and the skeleton of a polymer main chain, the type of a side chain constituting the acrylic copolymer, for example, are not particularly limited.

The acrylic copolymer of the component (A) has a weight-average molecular weight of preferably 1,000 to 200,000, more preferably 2,000 to 150,000, and further preferably 3,000 to 100,000. An excessively high weight-average molecular weight exceeding 200,000 may reduce the solubility in solvent, so that the handling property may deteriorate, and an excessively low weight-average molecular weight below 1,000 may cause insufficient curing during heat curing, so that the solvent resistance and the heat resistance may decrease. The weight-average molecular weight herein is a value obtained by gel permeation chromatography (GPC) using polystyrene as the standard sample. The same method is used hereinafter in the present specification.

As a method for synthesizing the acrylic copolymer having the photo-aligning group of the component (A), a method of polymerizing a monomer having a photo-aligning group, which is a monomer having the photo-aligning group of Formula (1), for example, is simple and easy.

Examples of the monomer having the photo-aligning group of Formula (1) include 4-(6-methacryloxyhexyl-1-oxy)cinnamic acid, 4-(6-acryloxyhexyl-1-oxy)cinnamic acid, 4-(3-methacryloxypropyl-1-oxy)cinnamic acid, 4-(6-methacryloxyhexyl-1-oxy)cinnamamide, 4-(6-acryloxy-hexyl-1-oxy)cinnamamide, 4-(3-methacryloxypropyl-1-oxy)cinnamamide, 4-(4-(3-methacryloxypropyl-1-oxy)acryloxy)benzoic acid, 4-(4-(6-methacryloxyhexyl-1-oxy)benzoyloxy)cinnamic acid, 4-(6-methacryloxyhexyl-1-oxy)-N-(4-cyanophenyl)cinnamamide, and 4-(6-methacryloxyhexyl-1-oxy)-N-bishydroxyethyl cinnamamide.

The component (A) contained in the retardation material-forming resin composition of the present invention is preferably an acrylic copolymer that, in addition to the photo-aligning group, further has a self-crosslinking group, or further has a group (hereinafter, also called "cross-linking group") that reacts with at least one group A selected from the group consisting of hydroxy group, carboxy group, amide group, amino group, an alkoxysilyl group, and a group of Formula (2) [when an end portion of the photo-aligning group is carboxy group or amide group, this end portion is also included in the group A].

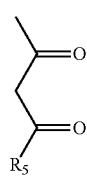

(2)

(In the Formula, $R_5$ is an alkyl group, an alkoxy group, or a phenyl group.)

In Formula (2), preferable examples of the alkyl group of $R_5$ include $C_{1-20}$ alkyl groups, and $C_{1-5}$ alkyl groups.

Examples of these alkyl groups include methyl group, ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, n-heptyl group, n-octyl group, n-nonyl group, n-decanyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, cyclopropyl group, cyclobutyl group, cyclopentyl group, cyclohexyl group, and cycloheptyl group.

Among them, methyl group, ethyl group, n-propyl group, n-butyl group, and isobutyl group, and the like are preferred.

In Formula (2), preferable examples of the alkoxy group of $R_5$ include $C_{1-20}$ alkoxy groups, and $C_{1-5}$ alkoxy groups.

Examples of these alkoxy groups include methoxy group, ethoxy group, n-propoxy group, i-propoxy group, n-butoxy group, i-butoxy group, s-butoxy group, t-butoxy group, n-pentoxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, n-hexyloxy group, 1-methyl-n-pentyloxy group, 2-methyl-n-pentyloxy group, 3-methyl-n-pentyloxy group, 4-methyl-n-pentyloxy group, 1, 1-dimethyl-n-butoxy group, 1, 2-dimethyl-n-butoxy group, 1, 3-dimethyl-n-butoxy group, 2, 2-dimethyl-n-butoxy group, 2, 3-dimethyl-n-butoxy group, 3, 3-dimethyl-n-butoxy group, 1-ethyl-n-butoxy group, 2-ethyl-n-butoxy group, 1, 1, 2-trimethyl-n-propoxy group, 1, 2, 2-trimethyl-n-propoxy group, 1-ethyl-1-methyl-n-propoxy group, 1-ethyl-2-methyl-n-propoxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosadecyloxy group, cyclopropoxy group, cyclobutoxy group, cyclopentyloxy group, cyclohexyloxy group, and cycloheptyloxy group.

Among them, the methoxy group, the ethoxy group, and the n-propoxy group, and the like are preferred.

As a method for synthesizing the acrylic copolymer that further has a self-crosslinking group or further has a cross-linking group in addition to the photo-aligning group, a method of polymerizing a monomer having the photo-aligning group with a monomer having a self-crosslinking group or a monomer having a cross-linking group is simple and easy.

Examples of the self-crosslinking group and the cross-linking group include an alkoxymethylamide group, hydroxymethylamide group, an alkoxysilyl group, glycidyl group, epoxycyclohexyl group, vinyl group, and a blocked isocyanate group. The content of the self-crosslinking group or the cross-linking group to be contained in the resin of the component (A) is preferably 0.1 to 0.9 per repeating unit in the resin of the component (A), and more preferably 0.1 to 0.8 from the viewpoint of balance between alignment properties and solvent resistance of the orientation material.

Examples of the monomer having a self-crosslinking group and a cross-linking group include a (meth)acrylamide compound substituted with a hydroxymethyl group or a alkoxymethyl group such as N-hydroxymethyl(meth) acrylamide, N-methoxymethyl(meth) acrylamide, N-ethoxymethyl(meth) acrylamide, and N-butoxymethyl(meth) acrylamide; a monomer having a trialkoxysilyl group such as 3-trimethoxysilyl propylacrylate, 3-triethoxysilyl propylacrylate, 3-trimethoxysilylpropyl methacrylate, and 3-triethoxysilylpropyl methacrylate; a monomer having glycidyl group or epoxycyclohexyl group such as glycidyl acrylate, glycidyl methacrylate, and 3,4-epoxycyclohexylmethylmethacrylate; a monomer having a vinyl group such as 1,2-epoxy-5-hexene and 1,7-octadiene monoepoxide; and a monomer having a blocked isocyanate group such as 2-(O-(1'-methylpropylideneamino)carboxyamino)ethyl methacrylate and 2-(3,5-dimethylpyrazolyl)carbonylamino)ethyl methacrylate. Herein, the (meth)acrylamide means both of acrylamide and methacrylamide.

The component (A) contained in the retardation material-forming resin composition of the present invention is preferably an acrylic copolymer that further has, in addition to the photo-aligning group, at least one group A selected from the group consisting of hydroxy group, carboxy group, amide group, amino group, an alkoxysilyl group, and a group of Formula (2) [when an end portion of the photo-aligning group is carboxy group or amide group, this end portion is also included in the group A].

Examples of the group of Formula (2) include structures:

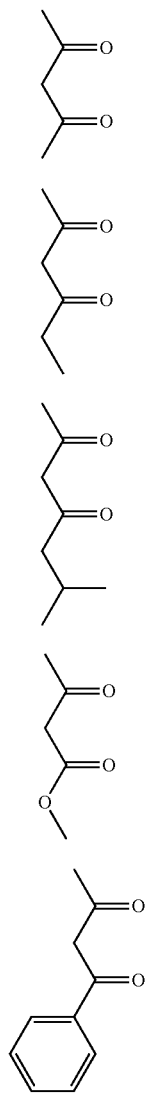

[A-1]

[A-2]

[A-3]

[A-4]

[A-5]

As a method for synthesizing the acrylic copolymer that further has, in addition to the photo-aligning group, at least one group A selected from the group consisting of hydroxy group, carboxy group, amide group, amino group, an alkoxysilyl group, and a group of Formula (2), a method of polymerizing a monomer having the photo-aligning group with a monomer having the at least one group A selected from the group consisting of hydroxy group, carboxy group, amide group, amino group, an alkoxysilyl group, and a group of Formula (2) is simple and easy.

Examples of the monomer having at least one group A selected from the group consisting of hydroxy group, carboxy group, amide group, amino group, an alkoxysilyl group, and a group of Formula (2) include: a monomer having hydroxy group such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy)ethyl ester, poly(ethylene glycol)ethylether acrylates, poly(ethylene glycol)ethylether methacrylates, 5-acryloyloxy-6-hydroxynorbornene-2-carboxylic-6-lactone, and 5-methacryloyloxy-6-hydroxynorbornene-2-carboxylic-6-lactone; a monomer having carboxy group such as acrylic acid, methacrylic acid, crotonic acid, mono-(2-(acryloyloxy)ethyl)phthalate, mono-(2-(methacryloyloxy)ethyl)phthalate, N-(carboxyphenyl)maleimide, N-(carboxyphenyl)methacrylamide, and N-(carboxyphenyl)acrylamide; a monomer having phenolic hydroxy group such as hydroxystyrene, N-(hydroxyphenyl)methacrylamide, N-(hydroxyphenyl)acrylamide, N-(hydroxyphenyl)maleimide, and N-(hydroxyphenyl)maleimide; a monomer having amide group such as acrylamide, methacrylamide, N-methylacrylamide, N,N-dimethylacrylamide, and N,N-diethylacrylamide; a monomer having amino group such as aminoethyl acrylate, aminoethyl methacrylate, aminopropyl acrylate, and aminopropyl methacrylate; a monomer having an alkoxysilyl group such as 3-acryloyloxy trimethoxysilane, 3-acryloyloxy triethoxysilane, 3-methacryloyloxy trimethoxysilane, and 3-methacryloyloxy triethoxysilane and a monomer having a group of Formula (2) such as 2-acetoacetoxyethyl acrylate and 2-acetoacetoxyethyl methacrylate (ethylene glycol mono-acetoacetate monomethacrylate).

The component (A) contained in the retardation material-forming resin composition of the present invention is preferably an acrylic copolymer that further has, in addition to the photo-aligning group, a group (cross-linking group) that reacts with at least one group A selected from the group consisting of hydroxy group, carboxy group, amide group, amino group, an alkoxysilyl group, and a group of Formula (2) [when an end portion of the photo-aligning group is carboxy group or amide group, this end portion is also included in the group A] and the at least one group A.

As a method for synthesizing the acrylic copolymer that further has, in addition to the photo-aligning group, a cross-linking group and at least one group A selected from the group consisting of hydroxy group, carboxy group, amide group, amino group, an alkoxysilyl group, and a group of Formula (2), a method of polymerizing a monomer having the photo-aligning group with a monomer having a cross-linking group and also with a monomer having at least one group A selected from the group consisting of hydroxy group, carboxy group, amide group, amino group, an alkoxysilyl group, and a group of Formula (2) is simple and easy.

The monomer having the photo-aligning group, the monomer having a cross-linking group, and the monomer having at least one group A selected from the group consisting of hydroxy group, carboxy group, amide group, amino group, an alkoxysilyl group, and a group of Formula (2) have been described in the foregoing.

In the present invention, when the specific copolymer is obtained, in addition to the monomer having the photo-aligning group, the monomer having a self-crosslinking group or the monomer having a cross-linking group, and the monomer having at least one group A selected from hydroxy group, carboxy group, amide group, amino group, an alkoxysilyl group, and a group of Formula (2) (hereinafter, the photo-aligning group, the self-crosslinking group, the cross-linking group, and the hydroxy group, the carboxy group, the amide group, the amino group, the alkoxysilyl group, and the group of Formula (2) are called "specific functional group 1"), another monomer that can be copolymerized with these monomers and does not have the specific functional group 1 can be used.

Specific examples of such another monomer include an acrylic acid ester compound, a methacrylic acid ester compound, a maleimide compound, an acrylamide compound, acrylonitrile, maleic anhydride, a styrene compound, and a vinyl compound.

Specific examples of the monomer are described below, but the monomer is not limited to these.

Examples of the acrylic acid ester compound include methyl acrylate, ethyl acrylate, isopropyl acrylate, benzyl acrylate, naphthyl acrylate, anthryl acrylate, anthrylmethyl acrylate, phenyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, tetrahydrofurfuryl acrylate, 3-methoxybutyl acrylate, 2-methyl-2-adamanthyl acrylate, 2-propyl-2-adamanthyl acrylate, 8-methyl-8-tricyclodecyl acrylate, and 8-ethyl-8-tricyclodecyl acrylate.

Examples of the methacrylic acid ester compound include methyl methacrylate, ethyl methacrylate, isopropyl methacrylate, benzyl methacrylate, naphthyl methacrylate, anthryl methacrylate, anthrylmethyl methacrylate, phenyl methacrylate, 2,2,2-trifluoroethyl methacrylate, tert-butyl methacrylate, cyclohexyl methacrylate, isobornyl methacrylate, 2-methoxyethyl methacrylate, methoxy triethylene glycol methacrylate, 2-ethoxy ethyl methacrylate, tetrahydrofurfuryl methacrylate, 3-methoxybutyl methacrylate, 2-methyl-2-adamanthyl methacrylate, γ-butyrolactone methacrylate, 2-propyl-2-adamanthyl methacrylate, 8-methyl-8-tricyclodecyl methacrylate, and 8-ethyl-8-tricyclodecyl methacrylate.

Examples of the vinyl compound include methylvinyl ether, benzylvinyl ether, vinyl naphthalene, vinyl carbazole, allyl glycidyl ether, and 3-ethenyl-7-oxabicyclo[4.1.0]heptane.

Examples of the styrene compound include styrene, methylstyrene, chlorostyrene, and bromostyrene.

Examples of the maleimide compound include maleimide, N-methylmaleimide, N-phenylmaleimide, and N-cyclohexylmaleimide.

The amounts of the respective monomers to be used to obtain the specific copolymer are, based on the total amount of all monomers, preferably 10% to 90% by mole for the monomer having the photo-aligning group, and 10% to 90% by mole for a monomer having a substituent selected from the self-crosslinking group, the group A, and the cross-linking group (these are called "specific cross-linking group 1" as a whole, which includes a substituent at an end of the photo-aligning group.). When the content of the monomer having the specific cross-linking group 1 is lower than 10% by mole, it is difficult to impart satisfactory thermosetting properties, and it is also difficult to maintain highly sensitive and excellent liquid crystal alignment properties.

When the monomer that does not have the specific functional group 1 is used to obtain the specific copolymer, the amount used of this monomer is preferably equal to or lower than 90% by mole, based on the total amount of all monomers.

Although the method for obtaining the specific copolymer to be used in the present invention is not limited to a particular method, the specific copolymer can be obtained, for example, by subjecting the monomer having the specific functional group 1, a monomer that does not have the specific functional group 1 if desired, and a polymerization initiator or the like to polymerization reaction in a solvent in which they coexist at a temperature of 50° C. to 110° C. The solvent to be used herein is not limited as long as the solvent can dissolve the monomer having the specific functional group 1, the monomer that does not have the specific functional group 1 used if desired, and a polymerization initiator or the like. Specific examples thereof will be given in <Solvent> described below.

The specific copolymer to be obtained by the above-described method is generally in a solution state of being dissolved in the solvent.

A solution of the specific copolymer obtained by the method is poured into diethyl ether, water, or the like with stirring and the specific copolymer is reprecipitated. The precipitate thus obtained is filtered and washed, and then is dried at room temperature or dried by heating under atmospheric pressure or reduced pressure. Thus, a powder of the specific copolymer can be prepared. By this operation, the polymerization initiator and an unreacted monomer that coexist with the specific copolymer can be removed, and consequently, a powder of the purified specific copolymer can be obtained. If the specific copolymer cannot be sufficiently purified by one operation, the obtained powder may be redissolved in a solvent, followed by repeating the above-described operation.

In the present invention, the specific copolymer may be used in a form of powder or in a form of solution in which the purified powder is redissolved in a solvent described below.

In the present invention, the specific copolymer of the component (A) may be a mixture of a plurality of types of specific copolymers.

<Component (B)>

The retardation material-forming resin composition of the present invention may contain a cross-linking agent as the component (B). Examples of the component (B) include a cross-linking agent that reacts with at least one group A selected from the group consisting of hydroxy group, carboxy group, amide group, amino group, an alkoxysilyl group, and a group of Formula (2).

Examples of the cross-linking agent that is the component (B) include compounds such as an epoxy compound, a methylol compound, an isocyanate compound, a phenoplast compound, a compound having two or more trialkoxysilyl groups, and an alkoxysilane compound having amino group; an organometallic compound having an alkoxy group and/or a chelating ligand; and polymers such as a polymer of an N-alkoxymethyl acrylamide, a polymer of a compound having epoxy group, a polymer of a compound having an alkoxysilyl group, a polymer of a compound having isocyanate group, and a melamine formaldehyde resin.

Specific examples of the epoxy compound include ethyleneglycol diglycidylether, polyethyleneglycol diglycidylether, propyleneglycol diglycidylether, tripropyleneglycol diglycidylether, polypropyleneglycol diglycidylether, neopentylglycol diglycidylether, 1,6-hexanediol diglycidylether, glycerindiglycidylether, 2,2-dibromoneopentylglycoldiglycidylether, 1,3,5,6-tetraglycidyl-2,4-hexanediol, N,N,N', N'-tetraglycidyl-m-xylenediamine, 1,3-bis(N,N-diglycidylaminomethyl)cyclohexane, and N,N,N',N'-tetraglycidyl-4,4'-diaminodiphenylmethane.

Specific examples of the methylol compound include compounds such as an alkoxymethylated glycoluril, an alkoxymethylated benzoguanamine, and an alkoxymethylated melamine.

Specific examples of the alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of commercially available products thereof include: compounds such as glycoluril compounds (trade name: CYMEL (registered trademark) 1170, and Powderlink (registered trademark) 1174), methylated urea resins (trade name: UFR (registered trademark) 65), and butylated urea resins (trade name: UFR (registered trademark) 300, U-VAN10S60, U-VAN10R, and U-VAN11HV) manufactured by Mitsui Cytec Ltd.; and urea/formaldehyde-based resins (highly condensed type, trade name: Beckamine (registered trademark) J-300S, Beckamine P-955, and Beckamine N) manufactured by DIC Corporation.

Specific examples of the alkoxymethylated benzoguanamine include tetramethoxymethyl benzoguanamine. Examples of commercially available products thereof include a product (trade name: CYMEL (registered trademark) 1123) manufactured by Mitsui Cytec Ltd. and products (trade name: NIKALAC (registered trademark) BX-4000, NIKALAC BX-37, NIKALAC BL-60, and NIKALAC BX-55H) manufactured by Sanwa Chemical Co., Ltd.

Specific examples of the alkoxymethylated melamine include hexamethoxymethyl melamine. Examples of commercially available products thereof include methoxymethyl-type melamine compounds (trade name: CYMEL (registered trademark) 300, CYMEL 301, CYMEL 303, and CYMEL 350) and butoxymethyl-type melamine compounds (trade name: Mycoat (registered trademark) 506, and 508) manufactured by Mitsui Cytec Ltd., and methoxymethyl-type melamine compounds (trade name: NIKALAC (registered trademark) MW-30, NIKALAC MW-22, NIKALAC MW-11, NIKALAC MS-001, NIKALAC MX-002, NIKALAC MX-730, NIKALAC MX-750, and NIKALAC MX-035) and butoxymethyl-type melamine compounds (trade name: NIKALAC (registered trademark) MX-45, NIKALAC MX-410, and NIKALAC MX-302) manufactured by Sanwa Chemical Co., Ltd.

The component (B) may also be a compound to be obtained by condensing a melamine compound, a urea compound, a glycoluril compound, or a benzoguanamine compound in which a hydrogen atom of amino group is substituted with methylol group or an alkoxymethyl group. Examples thereof include a high-molecular-weight compound produced from a melamine compound or a benzoguanamine compound described in U.S. Pat. No. 6,323,310. Examples of commercially available products of the melamine compound include a product trade-named CYMEL (registered trademark) 303 (manufactured by Mitsui Cytec Ltd.), and examples of commercially available products of the benzoguanamine compound include a product trade-named CYMEL (registered trademark) 1123 (manufactured by Mitsui Cytec Ltd.).

Specific examples of the isocyanate compound include VESTANAT B1358/100 and VESTAGON BF 1540 (these are isocyanurate-type modified polyisocyanates manufactured by Degussa Japan Co., Ltd.), and Takenate (registered trademark) B-882N and Takenate B-7075 (these are isocyanurate-type modified polyisocyanates manufactured by Mitsui Chemicals, Inc.).

Specific examples of the phenoplast compound include compounds below, but the phenoplast compound is not limited to these exemplified compounds.

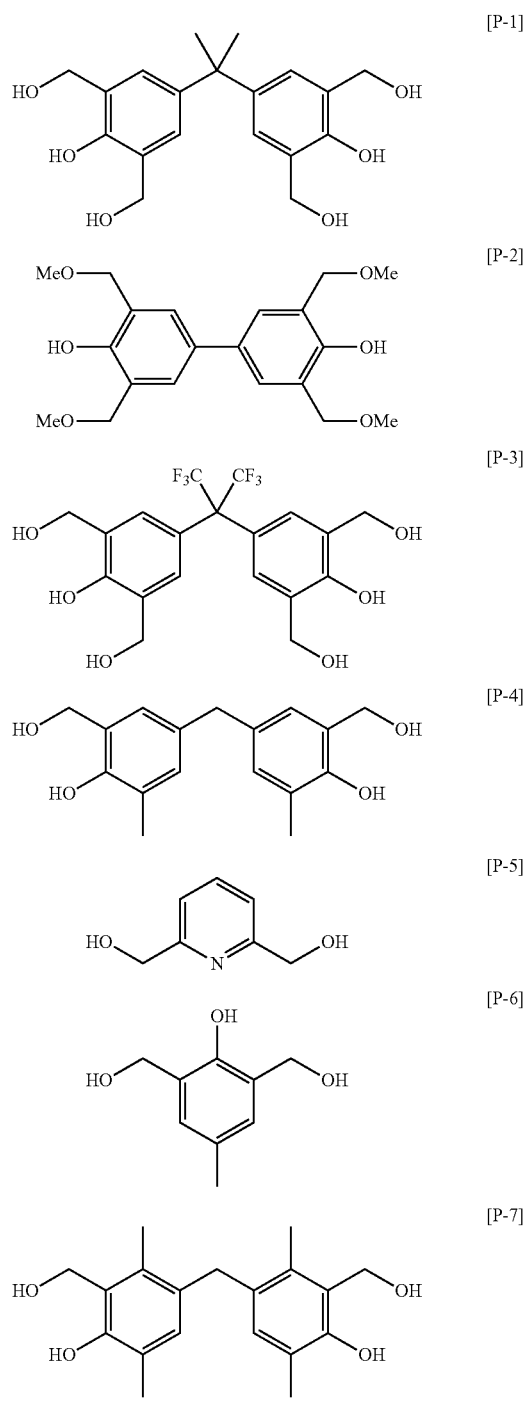

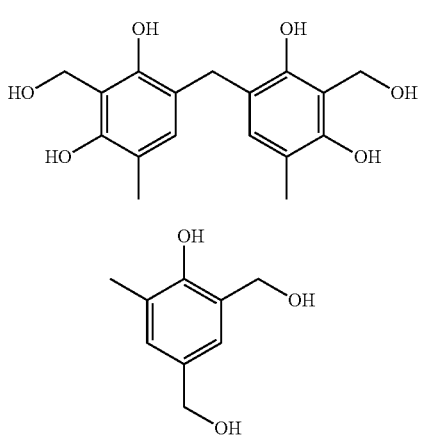

[P-8]

[P-9]

Specific examples of the compound having two or more trialkoxysilyl groups include compounds such as 1,4-bis(trimethoxysilyl)benzene, 1,4-bis(triethoxysilyl)benzene, 4,4'-bis(trimethoxysilyl)biphenyl, 4,4'-bis(triethoxysilyl)biphenyl, bis(trimethoxysilyl)ethane, bis(triethoxysilyl)ethane, bis(trimethoxysilyl)methane, bis(triethoxysilyl)methane, bis(trimethoxysilyl)ethylene, bis(triethoxysilyl)ethylene, 1,3-bis(trimethoxysilylethyl)tetramethyldisiloxane, 1,3-bis(triethoxysilylethyl)tetramethyldisiloxane, bis(triethoxysilyl methyl)amine, bis(trimethoxysilylmethyl)amine, bis(triethoxysilylpropyl)amine, bis(trimethoxysilylpropyl)amine, bis(3-trimethoxysilyl propyl)carbonate, bis(3-triethoxysilylpropyl)carbonate, bis[(3-trimethoxysilyl)propyl]disulfide, bis[(3-triethoxysilyl)propyl]disulfide, bis[(3-trimethoxysilyl)propyl]thiourea, bis[(3-triethoxysilyl)propyl]thiourea, bis[(3-trimethoxysilyl)propyl]urea, bis[(3-triethoxysilyl)propyl]urea, 1,4-bis(trimethoxysilylmethyl)benzene, 1,4-bis(triethoxysilylmethyl)benzene, tris(trimethoxysilylpropyl)amine, tris(triethoxysilylpropyl)amine, 1,1,2-tris(trimethoxysilyl)ethane, 1,1,2-tris(triethoxysilyl)ethane, tris(3-trimethoxysilylpropyl)isocyanurate, and tris(3-triethoxysilylpropyl)isocyanurate.

Specific examples of the alkoxysilane compound having amino group include compounds such as N,N-bis[3-(trimethoxysilyl)propyl]-1,2-ethanediamine, N,N'-bis[3-(triethoxysilyl)propyl]-1,2-ethanediamine, N-[3-(trimethoxysilyl)propyl]-1,2-ethanediamine, N-[3-(triethoxysilyl)propyl]-1,2-ethanediamine, bis-{3-(trimethoxysilyl)propyl}amine, bis-{3-(triethoxysilyl)propyl}amine, 3-aminopropyltrimethoxysilane, 3-aminopropyltriethoxysilane, trimethoxy{3-(methylamino)propylsilane, 3-(N-allylamino)propyltrimethoxysilane, 3-(N-allylamino)propyltriethoxysilane, 3-(diethylamino)propyltrimethoxysilane, 3-(diethylamino)propyltriethoxysilane, 3-(phenylamino)propyltrimethoxysilane, and 3-(phenylamino)propyltriethoxysilane.

Specific examples of the organometallic compound having an alkoxy group and/or a chelating ligand include compounds such as diisopropoxy ethylacetoacetate aluminum, diisopropoxy acetylacetonate aluminum, triacetyl acetonate aluminum, tetrakis isopropoxy titanium, tetrakis n-butoxy titanium, tetraoctyl titanate, diisopropoxybis(acetylacetonate)titanium, titanium tetraacetylacetonate, tetrakis(n-propoxy)zirconium, tetrakis(n-butoxy)zirconium, and tetrakis(acetylacetonate)zirconium.

Examples of the polymer of N-alkoxymethyl acrylamides include a polymer produced by using an acrylamide compound or a methacrylamide compound substituted with hydroxymethyl group or an alkoxymethyl group such as N-hydroxymethyl(meth)acrylamide, N-methoxymethyl(meth)acrylamide, N-ethoxymethyl(meth)acrylamide, and N-butoxymethyl(meth)acrylamide.

Specific examples of this polymer include a poly(N-butoxymethylacrylamide), a copolymer of N-butoxymethylacrylamide with styrene, a copolymer of N-hydroxymethylmethacrylamide with methyl methacrylate, a copolymer of N-ethoxymethylmethacrylamide with benzyl methacrylate, and a copolymer of N-butoxymethylacrylamide and benzyl methacrylate with 2-hydroxypropyl methacrylate. The weight-average molecular weight of the polymer is 1,000 to 200,000, more preferably 3,000 to 150,000, and further preferably 3,000 to 50,000.

Examples of the polymer of a compound having epoxy group include a polymer produced by using a compound having epoxy group such as glycidyl methacrylate, 3,4-epoxycyclohexylmethyl methacrylate, and 3,4-epoxycyclohexylmethyl methacrylate.

Specific examples of this polymer include a poly(3,4-epoxycyclohexylmethyl methacrylate), a poly(glycidyl methacrylate), a copolymer of glycidyl methacrylate with methyl methacrylate, a copolymer of 3, 4-epoxycyclohexylmethyl methacrylate with methyl methacrylate, and a copolymer of glycidyl methacrylate with styrene. The weight-average molecular weight of the polymer is 1,000 to 200,000, more preferably 3,000 to 150,000, and further preferably 3,000 to 50,000.

Examples of the polymer of a compound having an alkoxysilyl group include a polymer produced by using a compound having an alkoxysilyl group such as 3-methacryloxypropyl trimethoxysilane.

Specific examples of this polymer include a poly(3-methacryloxypropyl trimethoxy silane), a copolymer of 3-methacryloxypropyl trimethoxy silane with styrene, and a copolymer of 3-methacryloxypropyl trimethoxysilane with methyl methacrylate. The weight-average molecular weight of the polymer is 1,000 to 200,000, more preferably 3,000 to 150,000, and further preferably 3,000 to 50,000. In the present specification, the "poly((meth)acryloxypropyl trimethoxy silane)" means a poly(meth)acrylate having an alkoxysilyl group.

Examples of the polymer of a compound having isocyanate group include a polymer produced by using a compound having isocyanate group such as 2-isocyanatoethyl methacrylate (Karenz MOI [registered trademark] manufactured by Showa Denko K.K.) and 2-isocyanatoethyl acrylate (Karenz AOI [registered trademark] manufactured by Showa Denko K.K.), or a compound having a blocked isocyanate group such as 2-(0-[1'-methylpropylideneamino]carboxyamino)ethyl methacrylate (Karenz MOI-BM [registered trademark] manufactured by Showa Denko K.K.) and 2-[(3,5-dimethylpyrazolyl)carbonylamino]ethyl methacrylate (Karenz MOI-BP [registered trademark] manufactured by Showa Denko K.K.).

Specific examples of this polymer include a poly(2-isocyanatoethyl acrylate), a poly(2-(0-[1'-methylpropylideneamino]carboxyamino)ethyl methacrylate), a copolymer of 2-isocyanatoethyl methacrylate with styrene, and a copolymer of 2-[(3,5-dimethylpyrazolyl)carbonylamino]ethyl methacrylate with methyl methacrylate. The weight-average molecular weight of the polymer is 1,000 to 200,000, more preferably 3,000 to 150,000, and further preferably 3,000 to 50,000.

The melamine formaldehyde resin described above is a resin that is obtained by polycondensation between melamine and formaldehyde, and is a resin of Formula:

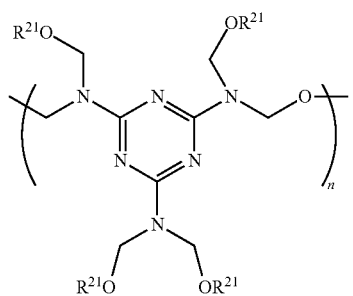

(In the Formula, $R^{21}$ is a hydrogen atom or a $C_{1-4}$ alkyl group; and n is a natural number representing the number of repeating units.)

In the melamine formaldehyde resin of the component (B), methylol group generated in the polycondensation between melamine and formaldehyde is preferably alkylated from the viewpoint of preservation stability.

Although the method for obtaining the melamine formaldehyde resin of the component (B) is not limited to a particular method, the melamine formaldehyde resin is synthesized generally by mixing melamine and formaldehyde, making this mixture weakly alkaline with sodium carbonate, ammonia, or the like, and then heating the mixture at 60° C. to 100° C. By additional reaction with alcohol, the methylol group can be alkoxylated.

The melamine formaldehyde resin of the component (B) has a weight-average molecular weight of preferably 250 to 5,000, more preferably 300 to 4,000, and further preferably 350 to 3,500. An excessively high weight-average molecular weight exceeding 5,000 may reduce the solubility in solvent, so that the handling property may deteriorate, and an excessively low weight-average molecular weight below 250 may cause insufficient curing during heat curing, so that the effect of improving the solvent resistance and the heat resistance cannot be sufficiently obtained in some cases.

In the retardation material-forming resin composition of the present invention, the melamine formaldehyde resin of the component (B) may be used in a form of liquid or in a form of solution in which the purified liquid is redissolved in a solvent described below.

These cross-linking agents may be used singly or in combination of two or more of them.

The content of the cross-linking agent of the component (B) in the retardation material-forming resin composition of the present invention is preferably 0 part by mass to 100 parts by mass, and more preferably 0 part by mass to 80 parts by mass, based on 100 parts by mass of the total amount of the resin of the component (A) and, as optional components, the component (C), the component (E), and the component (F). When the content of the cross-linking agent is excessively high, the photo-alignment properties and the preservation stability may deteriorate.

<Component (C)>

The retardation material-forming resin composition of the present invention may contain, as the component (C), a compound having at least two groups A (hereinafter, also called "specific functional group 2") selected from the group consisting of hydroxy group, carboxy group, amide group, amino group, an alkoxysilyl group, and a group of Formula (2). The component (C) may be a low-molecular compound or may be a high-molecular compound.

Examples of the low-molecular compound that is the component (C) include pentaerythritol, dipentaerythritol, diethylene glycol, triethylene glycol, dipropylene glycol, adipic acid, adipamide, hexamethylenediamine, 1,4-bis(acetoacetyl aminoethyl)cyclohexane, 1-(4-(2-(4-(3-oxo-butyl)-phenoxy)-ethoxy)-phenyl)-butane-1,3-dione, and 1,4-butanediol diacetoacetate.

Examples of the high-molecular compound that is the component (C) include a polymer having a straight-chain structure or a branched structure such as an acrylic polymer, a polyamic acid, a polyimide, a polyvinyl alcohol, a polyester, a polyester polycarboxylic acid, a polyether polyol, a polyester polyol, a polycarbonate polyol, a polycaprolactone polyol, a polyalkylene imine, a polyallylamine, celluloses (cellulose or derivatives thereof), and a phenol novolac resin; and a cyclic polymer such as cyclodextrins.

Preferred examples of the high-molecular compound that is the component (C) include an acrylic polymer, cyclodextrins, celluloses, a polyether polyol, a polyester polyol, a polycarbonate polyol, a polycaprolactone polyol, and a phenol novolac resin.

The acrylic polymer that is one preferred example of the high-molecular compound of the component (C) is a polymer that is obtained by polymerizing a monomer having an unsaturated double bond such as acrylic acid, methacrylic acid, styrene, and a vinyl compound, and only needs to be a polymer that is obtained by polymerizing monomers containing the groups A or a mixture thereof. The skeleton of a polymer main chain and the type of a side chain constituting the acrylic polymer, for example, are not particularly limited.

Examples of the monomers containing the groups A include a monomer having a polyethylene glycol ester group, a monomer having a $C_{2-5}$ hydroxyalkyl ester group, a monomer having a phenolic hydroxy group, a monomer having carboxy group, a monomer having amide group, a monomer having amino group, and a monomer having a group of Formula (2).

Examples of the monomer having a polyethylene glycol ester group include monoacrylate or monomethacrylate of H—(OCH$_2$CH$_2$)n-OH. Herein, the value of n is 2 to 50, and preferably 2 to 10.

Examples of the monomer having a $C_{2-5}$ hydroxyalkyl ester group include 2-hydroxyethyl methacrylate, 2-hydroxyethyl acrylate, 2-hydroxypropyl methacrylate, 2-hydroxypropyl acrylate, 4-hydroxybutyl acrylate, and 4-hydroxybutyl methacrylate.

Examples of the monomer having a phenolic hydroxy group include p-hydroxystyrene, m-hydroxystyrene, and o-hydroxystyrene.

Examples of the monomer having carboxy group include acrylic acid, methacrylic acid, and vinylbenzoic acid.

Examples of the monomer having amide group include acrylamide and methacrylamide.

Examples of the monomer having amino group include 2-aminoethyl acrylate, 2-aminoethyl methacrylate, aminopropyl acrylate, and aminopropyl methacrylate.

Examples of the monomer having an alkoxysilyl group include 3-acryloyloxy trimethoxysilane, 3-acryloyloxy triethoxysilane, 3-methacryloyloxy trimethoxysilane, and 3-methacryloyloxy triethoxysilane.

Examples of the monomer having a group of Formula (2) include 2-acetoacetoxyethyl acrylate and 2-acetoacetoxyethyl methacrylate.

When the acrylic polymer that is an example of the component (C) is synthesized in the present invention, a monomer that does not have the specific functional group 2 may be used as long as the effects of the present invention are not impaired.

Specific examples of this monomer include an acrylic acid ester compound, a methacrylic acid ester compound, a maleimide compound, acrylonitrile, maleic anhydride, a styrene compound, and a vinyl compound.

Examples of the acrylic acid ester compound include methyl acrylate, ethyl acrylate, isopropyl acrylate, benzyl acrylate, naphthyl acrylate, anthryl acrylate, anthryl methyl acrylate, phenyl acrylate, 2,2,2-trifluoroethyl acrylate, tert-butylacrylate, cyclohexyl acrylate, isobornyl acrylate, 2-methoxyethyl acrylate, methoxytriethylene glycol acrylate, 2-ethoxyethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate.

Examples of the methacrylic acid ester compound include methyl methacrylate, ethyl methacrylate, isopropyl methacrylate, benzyl methacrylate, naphthyl methacrylate, anthryl methacrylate, anthrylmethyl methacrylate, phenyl methacrylate, 2,2,2-trifluoroethyl methacrylate, tert-butyl methacrylate, cyclohexyl methacrylate, isobornyl methacrylate, 2-methoxyethyl methacrylate, methoxy triethylene glycol methacrylate, 2-ethoxy ethyl methacrylate, tetrahydrofurfuryl methacrylate, 3-methoxybutyl methacrylate, 2-methyl-2-adamanthyl methacrylate, 2-propyl-2-adamanthyl methacrylate, 8-methyl-8-tricyclodecyl methacrylate, and 8-ethyl-8-tricyclodecyl methacrylate.

Examples of the maleimide compound include maleimide, N-methylmaleimide, N-phenyl maleimide, and N-cyclohexyl maleimide.

Examples of the styrene compound include styrene, methylstyrene, chlorostyrene, and bromostyrene.

Examples of the vinyl compound include vinyl ether, methylvinyl ether, benzylvinyl ether, phenylvinyl ether, and propylvinyl ether.

The amount of the monomer to be used, the monomer having the specific functional group 2 to be used to obtain the acrylic polymer that is an example of the component (C), is preferably 2% by mole to 100% by mole based on the total amount of all monomers used to obtain the acrylic polymer that is the component (C). When the monomer having the specific functional group 2 is excessively low, the alignment properties of a cured film to be obtained is insufficient.

When the monomer that does not have the specific functional group 2 is used to obtain the acrylic polymer, the amount of the monomer to be used is preferably equal to or lower than 98% by mole based on the total amount of all monomers.

Although the method for obtaining the acrylic polymer that is an example of the component (C) is not limited to a particular method, the acrylic polymer can be obtained, for example, by subjecting the monomer having the specific functional group 2, a monomer that does not have the specific functional group 2 if desired, and a polymerization initiator or the like to polymerization reaction in a solvent in which they coexist at a temperature of 50° C. to 110° C. The solvent to be used herein is not limited as long as the solvent can dissolve the monomer having the specific functional group 2, the monomer that does not have the specific functional group 2 to be used if desired, and a polymerization initiator or the like. Specific examples thereof will be given in the <Solvent> section described later.

The acrylic polymer being an example of the component (C) to be obtained by the above-described method is generally in a state of being dissolved in the solvent.

A solution of the acrylic polymer being an example of the component (C) obtained by the method is poured into diethyl ether, water, or the like with stirring and the acrylic polymer is reprecipitated. The precipitate thus obtained is filtered and washed, and then is dried at room temperature or dried by heating under atmospheric pressure or reduced pressure. Thus, a powder of the acrylic polymer being an example of the component (C) can be prepared. By this operation, the polymerization initiator and an unreacted monomer that coexist with the acrylic polymer being an example of the component (C) can be removed, and consequently, a powder of the purified acrylic polymer as an example of the component (C) can be obtained. If the acrylic polymer cannot be sufficiently purified by one operation, the obtained powder may be redissolved in a solvent, followed by repeating the above-described operation.

The acrylic polymer being a preferred example of the component (C) has a weight-average molecular weight of preferably 3,000 to 200,000, more preferably 4,000 to 150,000, and still more preferably 5,000 to 100,000. An excessively high weight-average molecular weight exceeding 200,000 may reduce the solubility in solvent, so that the handling property may deteriorate, and an excessively low weight-average molecular weight below 3,000 may cause insufficient curing during heat curing, so that the solvent resistance and the heat resistance may decrease.

Examples of the cyclodextrins being one preferred example of the high-molecular compound of the component (C) include cyclodextrins such as α-cyclodextrin, β-cyclodextrin, and γ-cyclodextrin; methylated cyclodextrins such as methyl-α-cyclodextrin, methyl-n-cyclodextrin, and methyl-γ-cyclodextrin; and hydroxyalkyl cyclodextrins such as hydroxymethyl-α-cyclodextrin, hydroxymethyl-β-cyclodextrin, hydroxymethyl-γ-cyclodextrin, 2-hydroxyethyl-α-cyclodextrin, 2-hydroxyethyl-β-cyclodextrin, 2-hydroxyethyl-γ-cyclodextrin, 2-hydroxypropyl-α-cyclodextrin, 2-hydroxypropyl-β-cyclodextrin, 2-hydroxypropyl-γ-cyclodextrin, 3-hydroxypropyl-α-cyclodextrin, 3-hydroxypropyl-β-cyclodextrin, 3-hydroxypropyl-γ-cyclodextrin, 2,3-dihydroxypropyl-α-cyclodextrin, 2,3-dihydroxypropyl-β-cyclodextrin, and 2,3-dihydroxypropyl-γ-cyclodextrin. For example, the hydroxyalkyl cyclodextrins are preferred.

Examples of the celluloses being one preferred example of the high-molecular compound of the component (C) include hydroxyalkyl celluloses such as hydroxyethyl cellulose and hydroxypropyl cellulose; hydroxyalkyl alkyl celluloses such as hydroxyethyl methyl cellulose, hydroxypropyl methyl cellulose, and hydroxyethyl ethyl cellulose; and cellulose. For example, the hydroxyalkyl celluloses such as hydroxyethyl cellulose and hydroxypropyl cellulose are preferred.

Examples of the polyether polyol being one preferred example of the high-molecular compound of the component (C) include those obtained by adding propylene oxide, a polyethylene glycol, or a polypropylene glycol, or the like, to polyhydric alcohols such as a polyethylene glycol, a polypropylene glycol, propylene glycol, bisphenol A, triethylene glycol, and sorbitol. Specific examples of the polyether polyol include ADEKA polyether P-series, G-series, EDP-series, BPX-series, FC-series, and CM-series manufactured by ADEKA Corporation; and UNIOX (registered trademark) HC-40, HC-60, ST-30E, ST-40E, G-450, and G-750, UNIOL (registered trademark) TG-330, TG-1000, TG-3000, TG-4000, HS-1600D, DA-400, DA-700, and DB-400, and NONION (registered trademark) LT-221, ST-221, and OT-221 manufactured by NOF Corporation.

Examples of the polyester polyol being one preferred example of the high-molecular compound of the component (C) include those obtained by causing polyhydric carboxylic acids such as adipic acid, sebacic acid, and isophthalic acid to react with diols such as ethylene glycol, propylene glycol, butylene glycol, a polyethylene glycol, and a polypropylene glycol. Specific examples of the polyester polyol include POLYLITE (registered trademark) OD-X-286, OD-X-102, OD-X-355, OD-X-2330, OD-X-240, OD-X-668, OD-X-2108, OD-X-2376, OD-X-2044, OD-X-688, OD-X-2068, OD-X-2547, OD-X-2420, OD-X-2523, OD-X-2555, OD-X-2560 manufactured by DIC corporation; and Polyol P-510, P-1010, P-2010, P-3010, P-4010, P-5010, P-6010, F-510, F-1010, F-2010, F-3010, P-1011, P-2011, P-2013, P-2030, N-2010, and PNNA-2016 manufactured by Kuraray Co., Ltd.

Examples of the polycarbonate polyol being one preferred example of the high-molecular compound of the component (C) include those obtained by causing a polyhydric alcohol such as trimethylolpropane and ethylene glycol to react with diethyl carbonate, diphenyl carbonate, ethylene carbonate, or the like. Specific examples of the polycarbonate polyol include PLACCEL (registered trademark) CD205, CD205PL, CD210, and CD220 manufactured by Daicel Chemical Industries, Ltd.; and a polycarbonate diol C-590, C-1050, C-2050, C-2090, and C-3090 manufactured by Kuraray Co., Ltd.

Examples of the polycaprolactone polyol being one preferred example of high-molecular compound of the component (C) include those obtained by causing ring-opening polymerization of s-caprolactone, using a polyhydric alcohol such as trimethylolpropane and ethylene glycol as an initiator. Specific examples of the polycaprolactone polyol include POLYLITE (registered trademark) OD-X-2155, OD-X-640, and OD-X-2568 manufactured by DIC Corporation; and PLACCEL (registered trademark) 205, L205AL, 205U, 208, 210, 212, L212AL, 220, 230, 240, 303, 305, 308, 312, and 320 manufactured by Daicel Chemical Industries, Ltd.

Examples of the phenol novolac resin being one preferred example of the high-molecular compound of the component (C) include phenol-formaldehyde polycondensates.

In the retardation material-forming resin composition of the present invention, the compound of the component (C) may be used in a form of powder or in a form of solution in which the purified powder is redissolved in a solvent described below.

In the retardation material-forming resin composition of the present invention, the component (C) may be used singly, or a plurality of compounds exemplified as the component (C) may be used as a mixture.

The content of the component (C) in the retardation material-forming resin composition of the present invention is preferably 0 part by mass to 200 parts by mass, and more preferably 0 part by mass to 150 parts by mass, based on 100 parts by mass of the total amount of the resin of the component (A), the cross-linking agent of the component (B), and the compound of the component (E) and the monomer of the component (F) described later. When the content of the component (C) is excessively high, the photo-alignment properties may deteriorate.

<Component (D)>

The retardation material-forming resin composition of the present embodiment can further contain a cross-linking catalyst as a component (D) in addition to the component (A), the component (B), and the component (C).

The cross-linking catalyst that is the component (D) can be an acid or thermal acid generator, for example. This component (D) is effective in promoting heat-curing reaction of formation of the cured film with the retardation material-forming resin composition of the present invention.

When an acid or acid generator is used as the component (D), the component (D) is not limited as long as the component is a sulfonic acid group-containing compound, hydrochloric acid or a salt thereof, or a compound that thermally decomposes to generate an acid during prebaking or postbaking, that is, a compound that thermally decomposes to generate an acid at a temperature of 80° C. to 250° C.

Examples of such a compound include hydrochloric acid; and sulfonic acids such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid, and a hydrate or a salt thereof.

Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, and N-ethyl-p-toluenesulfonamide.

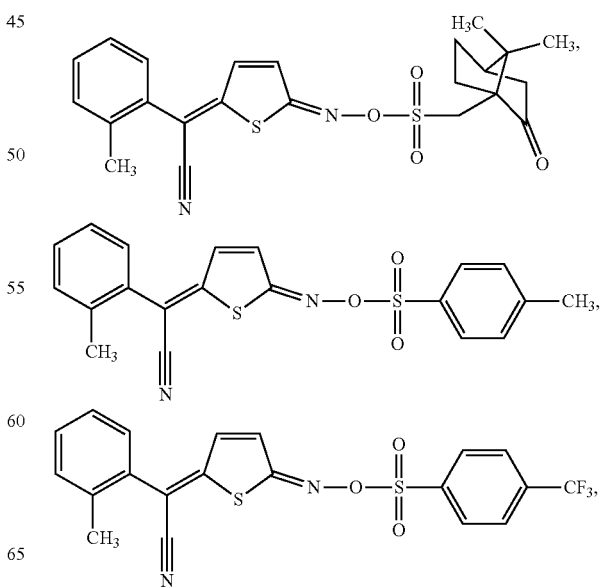

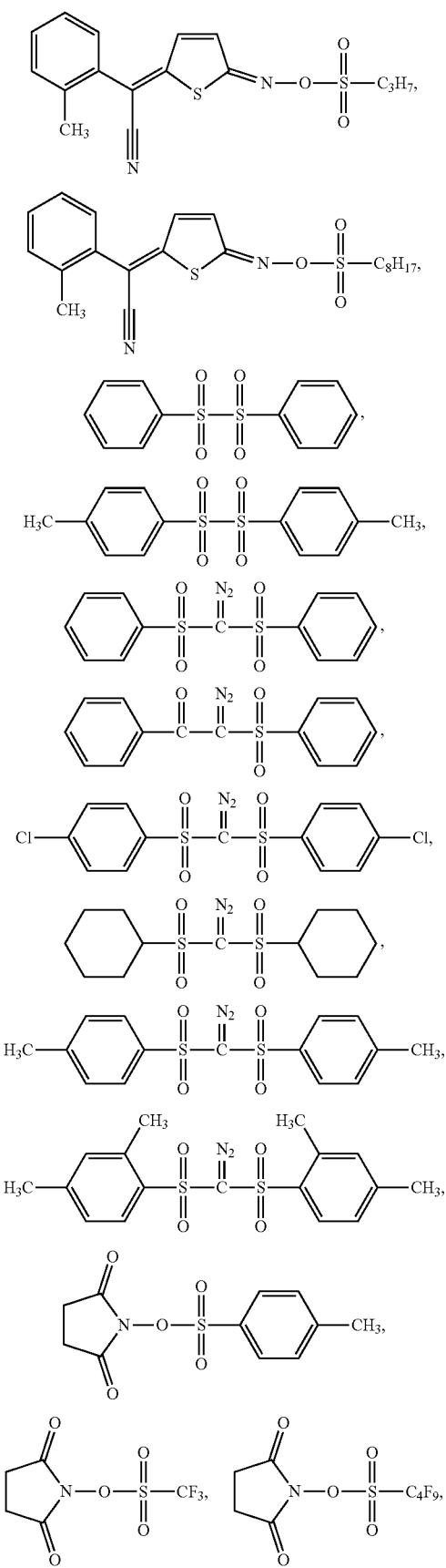
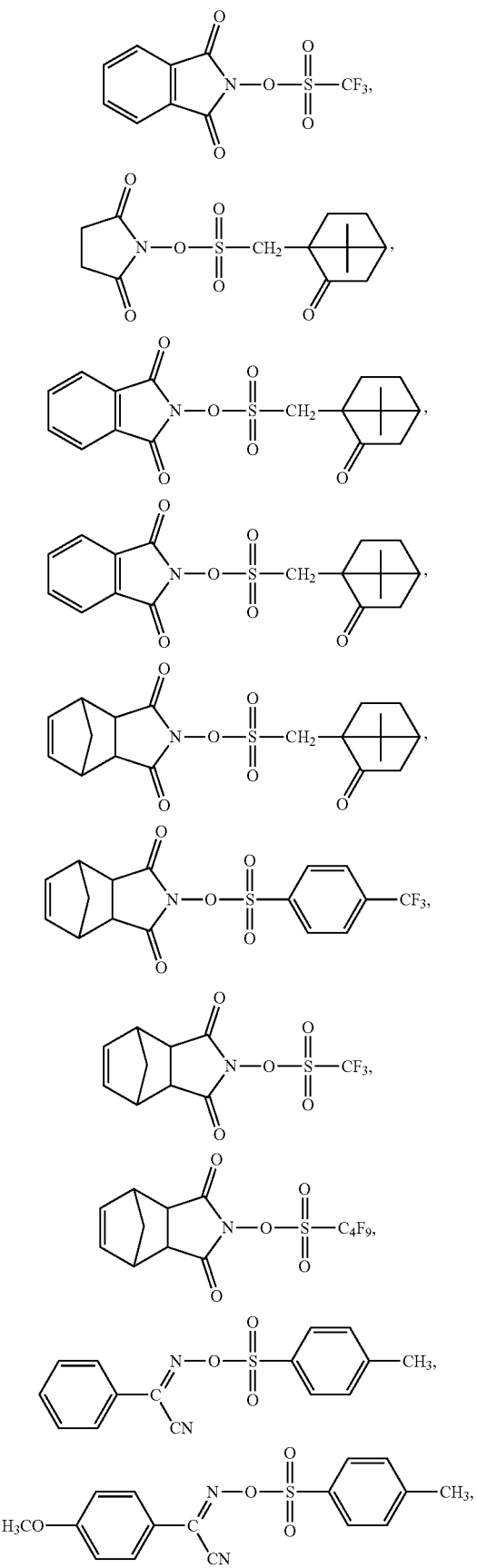

-continued

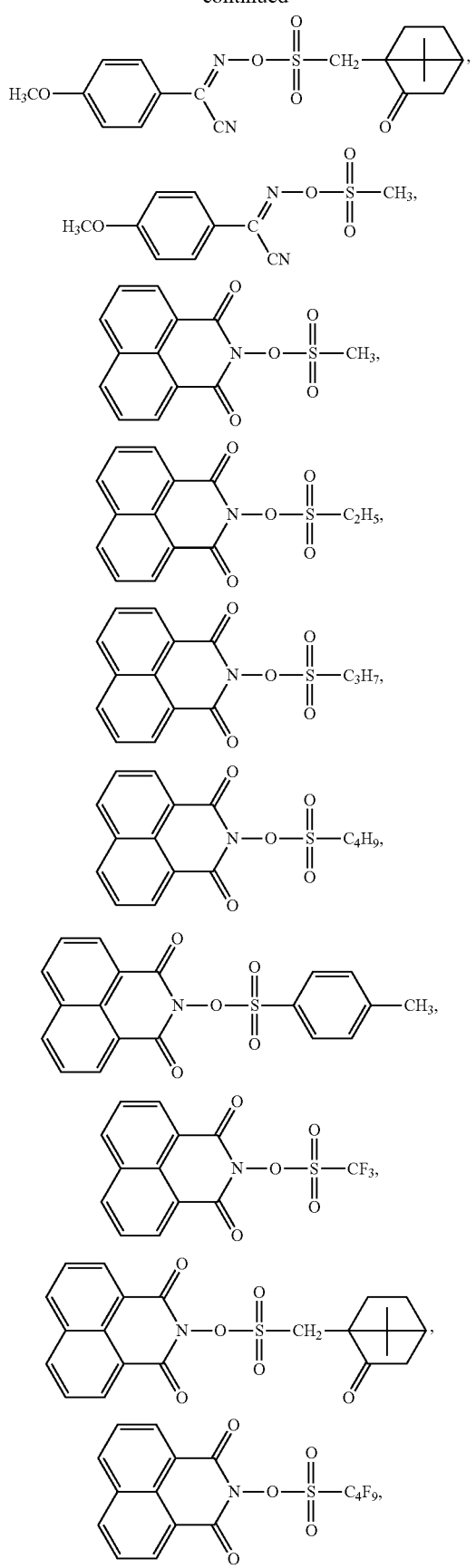

-continued

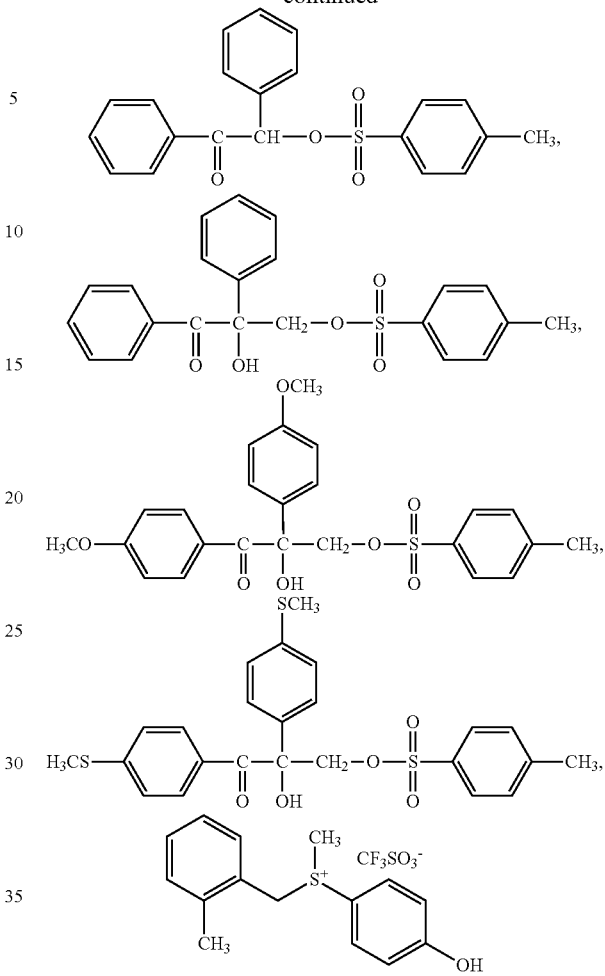

Examples of commercially available products of the compound that generates an acid by heat include TA100, TA120, and TA160 (manufactured by San-Apro Ltd.); K-PURE [registered trademark] TAG2689, K-PURE TAG2690, K-PURE CXC1614, and K-PURE CXC1738 (manufactured by King Industries Inc.); and San-Aid SI-100L and San-Aid SI-180L (manufactured by Sanshin Chemical Industry Co., Ltd.).

Other examples of the cross-linking catalyst that is the component (D) include a metal chelate compound and a silanol compound. Use of the metal chelate compound and the silanol compound in combination as the component (D) is effective in promoting heat-curing reaction of a cured film formed of the retardation material-forming resin composition of the present invention.

Examples of the metal chelate compound include a zirconium compound, a titanium compound, and an aluminum compound, and more specifically include diisopropyl titanium diacetylacetonate, titanium tetraacetylacetonate, zirconium tetraacetylacetonate, diisopropoxy ethylacetoacetate aluminum, diisopropoxy acetylacetonate aluminum, isopropoxy bis(ethylacetoacetate) aluminum, isopropoxy bis(acetylacetonate) aluminum, tris(ethylacetoacetate) aluminum, tris(acetylacetonate) aluminum [tris(2,4-pentanedionato) aluminum(III)], and monoacetylacetonate bis(ethylacetoacetate) aluminum.

Examples of the silanol compound include triphenyl silanol, trimethyl silanol, triethyl silanol, 1,1,3,3-tetraphenyl-1, 3-disiloxanediol, and 1,4-bis(hydroxydimethylsilyl)benzene.

The content of the component (D) in the retardation material-forming resin composition of the present invention is preferably 0 part by mass to 20 parts by mass, more preferably 0 part by mass to 15 parts by mass, and further preferably 0 part by mass to 10 parts by mass, with respect to 100 parts by mass of the total amount of the resin of the component (A), the cross-linking agent of the component (B), the compound of the component (C), and the compound of the component (E) and the monomer of the component (F) described later. When the content of the component (D) is higher than 20 parts by mass, the preservation stability of the composition may deteriorate.

<Component (E)>

The retardation material-forming resin composition of the present invention may contain, as the component (E), a compound having a group that can thermally cross-link with any of the component (A), the component (B) and the component (C), and a polymerizable group, that is, a compound having one or more polymerizable groups and at least one group A selected from the group consisting of hydroxy group, carboxy group, amide group, amino group, an alkoxysilyl group, and a group of Formula (2) or one or more groups that react with the at least one group A.

When a cured film formed of the retardation material-forming resin composition of the present invention containing the component (E) is used as an orientation material, the compound of the component (E) enhances adhesion between the cured film and a layer of polymerizable liquid crystal formed and cured on the cured film, and thus functions as an adhesion-enhancing component.

Preferred examples of the compound of the component (E) include a compound having a polymerizable group containing a C=C double bond and hydroxy group and a compound having a polymerizable group containing a C=C double bond and an N-alkoxymethyl group. Examples of the polymerizable group containing a C=C double bond include acrylic group, methacrylic group, vinyl group, an allyl group, and maleimide group.

Preferred examples of the compound of the component (E) having a polymerizable group containing a C=C double bond and hydroxy group include compounds below. However, the compound of the component (E) is not limited to these exemplified compounds.

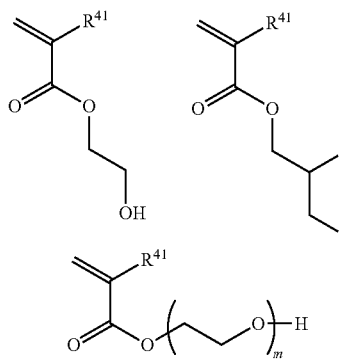

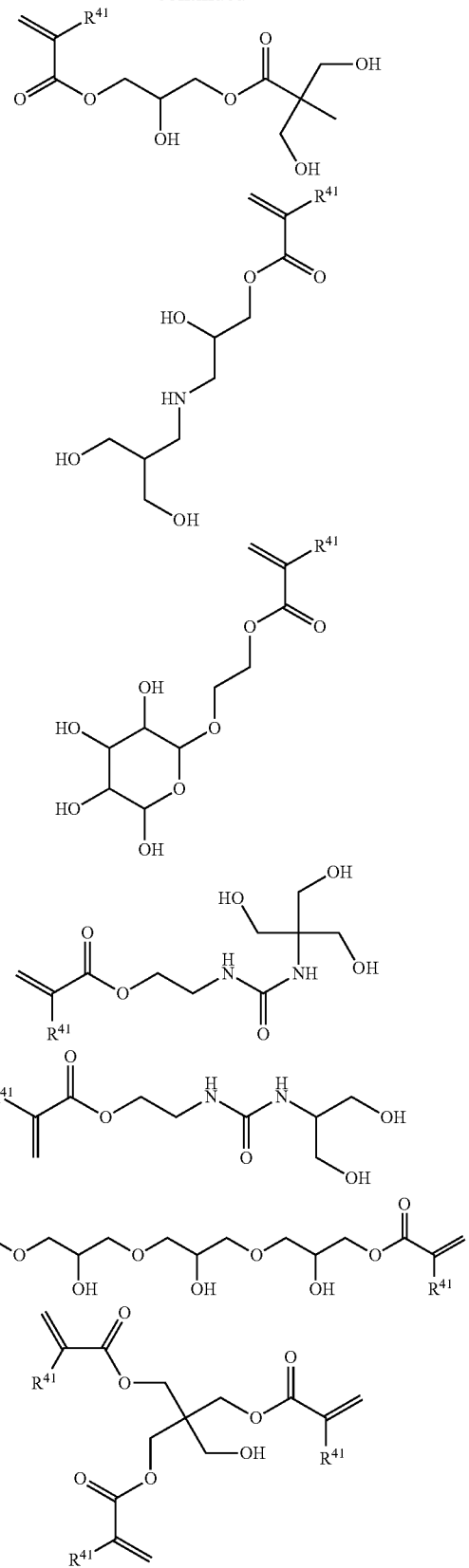

(In the Formulae, $R^{41}$ is a hydrogen atom or methyl group; and m is an integer of 1 to 10.)

In the compound having a polymerizable group containing a C=C double bond and an N-alkoxymethyl group as the component (E), examples of a nitrogen atom N of the N-alkoxymethyl group include a nitrogen atom of amide, a nitrogen atom of thioamide, a nitrogen atom of urea, a nitrogen atom of thiourea, a nitrogen atom of urethane, and a nitrogen atom bonded to a vicinal position of a nitrogen atom of a nitrogen-containing hetero ring. Thus, examples of the N-alkoxymethyl group include a structure in which an alkoxymethyl group binds to a nitrogen atom selected from a nitrogen atom of amide, a nitrogen atom of thioamide, a nitrogen atom of urea, a nitrogen atom of thiourea, a nitrogen atom of urethane, a nitrogen atom bonded to a vicinal position of a nitrogen atom of a nitrogen-containing hetero ring, and the like.

The compound having a polymerizable group containing a C=C double bond and an N-alkoxymethyl group as the component (E) only needs to have the group described above, and preferred examples thereof include a compound of Formula (X):

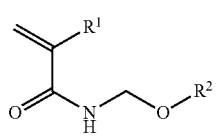

(X)

(In the Formula, $R^1$ is a hydrogen atom or methyl group; and $R^2$ is a hydrogen atom or a linear or branched alkyl group having a carbon atom number of 1 to 10.)

Examples of the alkyl group include methyl group, ethyl group, n-propyl group, isopropyl group, n-butyl group, isobutyl group, sec-butyl group, tert-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, n-heptyl group, 1-methyl-n-hexyl group, 2-methyl-n-hexyl group, 3-methyl-n-hexyl group, 1,1-dimethyl-n-pentyl group, 1,2-dimethyl-n-pentyl group, 1,3-dimethyl-n-pentyl group, 2,2-dimethyl-n-pentyl group, 2,3-dimethyl-n-pentyl group, 3,3-dimethyl-n-pentyl group, 1-ethyl-n-pentyl group, 2-ethyl-n-pentyl group, 3-ethyl-n-pentyl group, 1-methyl-1-ethyl-n-butyl group, 1-methyl-2-ethyl-n-butyl group, 1-ethyl-2-methyl-n-butyl group, 2-methyl-2-ethyl-n-butyl group, 2-ethyl-3-methyl-n-butyl group, n-octyl group, 1-methyl-n-heptyl group, 2-methyl-n-heptyl group, 3-methyl-n-heptyl group, 1,1-dimethyl-n-hexyl group, 1,2-dimethyl-n-hexyl group, 1,3-dimethyl-n-hexyl group, 2,2-dimethyl-n-hexyl group, 2,3-dimethyl-n-hexyl group, 3,3-dimethyl-n-hexyl group, 1-ethyl-n-hexyl group, 2-ethyl-n-hexyl group, 3-ethyl-n-hexyl group, 1-methyl-1-ethyl-n-pentyl group, 1-methyl-2-ethyl-n-pentyl group, 1-methyl-3-ethyl-n-pentyl group, 2-methyl-2-ethyl-n-pentyl group, 2-methyl-3-ethyl-n-pentyl group, 3-methyl-3-ethyl-n-pentyl group, n-nonyl group, and n-decyl group.

Specific examples of the compound of Formula (X) include N-butoxymethyl acrylamide, N-isobutoxymethyl acrylamide, N-methoxymethyl acrylamide, N-methoxymethyl methacrylamide, and N-methylol acrylamide.

Preferred examples of the compound having a polymerizable group containing a C=C double bond and an N-alkoxymethyl group as the component (E) in another aspect include a compound of Formula (X2):

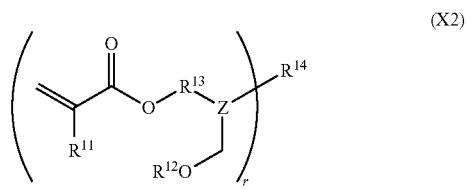

(X2)

(in the Formula, $R^{11}$ is a hydrogen atom or methyl group. $R^{13}$ and $R^{14}$ are independently a linear or branched alkylene group having a carbon atom number of 2 to 20, a $C_{5-6}$ aliphatic-ring group, or a $C_{5-6}$ aliphatic ring-containing aliphatic group, and in these groups, one methylene group or a plurality of unadjacent methylene groups may each be replaced with an ether bond. $R^{12}$ is a linear or branched alkyl group having a carbon atom number of 1 to 20, a $C_{5-6}$ aliphatic-ring group, or a $C_{5-6}$ aliphatic ring-containing aliphatic group, and in these groups, one methylene group or a plurality of unadjacent methylene groups may each be replaced with an ether bond. Z is >NCOO— or —OCON< (herein, "-" indicates that the number of bonding hands is one. ">" and "<" indicate that the number of bonding hands is two and either one bonding hand binds to —$CH_2OR^{12}$.). "r" is a natural number of two to nine.)

Specific examples of the $C_{2-20}$ alkylene group in the definition of $R^{13}$ and $R^{14}$ include a group with a valence of two to nine obtained by further removing one to eight hydrogen atoms from a $C_{2-20}$ alkyl group.

Specific examples of the $C_{2-20}$ alkyl group include ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, n-hexyl group, 1-methyl-n-pentyl group, 2-methyl-n-pentyl group, 1,1-dimethyl-n-butyl group, 1-ethyl-n-butyl group, 1,1,2-trimethyl-n-propyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, cyclopentyl group, cyclohexyl group, groups in which one or more out of these groups are bonded within a range of up to $C_{20}$, and groups in which one methylene group or a plurality of unadjacent methylene groups are each replaced with an ether bond.

Among the groups given above, $R^{13}$ and $R^{14}$ are each preferably a $C_{2-10}$ alkylene group and it is particularly preferable that $R^{13}$ be ethylene group and $R^{14}$ be hexylene group from the viewpoint of availability of raw material, for example.

Specific examples of the $C_{1-20}$ alkyl group in the definition of $R^{12}$ include the specific examples of the $C_{2-20}$ alkyl group and methyl group. Among them, the $C_{1-6}$ alkyl group is preferred, and the methyl group, the ethyl group, the n-propyl group, and the n-butyl group are particularly preferred.

Examples of r include natural numbers of two to nine, and among them, two to six are preferred.

The compound (X2) is obtained by a production method illustrated in a reaction scheme below. Specifically, the compound (X2) is produced by subjecting a carbamate compound (hereinafter, also called "compound (X2-1)") of Formula (X2-1) having acrylic group or methacryl group to reaction in a solvent into which trimethylsilyl chloride and paraformaldehyde are added to synthesize an intermediate of Formula (X2-2), and adding alcohol of $R^{12}$—OH to this reaction solution, thereby causing the solution to react.

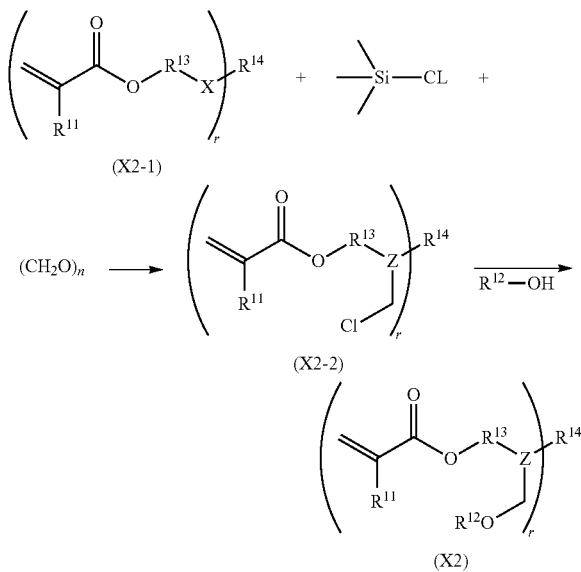

In the Formulae, $R^{11}$, $R^{12}$, $R^{13}$, $R^{14}$, Z, and r are those described above; and X is —NHCOO— or —OCONH—.

Although the amount of trimethylsilyl chloride and paraformaldehyde to be used to the compound (X2-1) is not limited to a particular amount, in order to complete the reaction, with respect to one carbamate bond in a molecule, 1.0 equivalent to 6.0 equivalents of trimethylsilyl chloride is preferably used, and 1.0 equivalent to 3.0 equivalents of paraformaldehyde is preferably used, in which the equivalents of trimethylsilyl chloride to be used are preferably larger than the equivalents of paraformaldehyde to be used.

The reaction solvent is not limited as long as the solvent is inert to reaction, and examples thereof include hydrocarbons such as hexane, cyclohexane, benzene, and toluene; halogenated hydrocarbons such as methylene chloride, carbon tetrachloride, chloroform, and 1,2-dichloroethane; ethers such as diethyl ether, diisopropyl ether, 1,4-dioxane, and tetrahydrofuran; nitriles such as acetonitrile and propionitrile; a nitrogen-containing aprotic polar solvent such as N,N-dimethylformamide, N,N-dimethylacetamide, N-methyl-2-pyrrolidone, and 1,3-dimethyl-2-imidazolidinone; and pyridines such as pyridine and picoline. These solvents may be used singly or in combination of two or more of them. Methylene chloride and chloroform are preferred, and methylene chloride is more preferred.

Although the amount (the reaction concentration) of the solvent to be used is not limited to a particular value, the reaction may be performed without the solvent, or the solvent may be used in an amount of 0.1 to 100 times by mass the amount of the compound (X2-1). The amount to be used is preferably 1 to 30 times by mass, and more preferably 2 to 20 times by mass.

Although the reaction temperature is not limited to a particular temperature, the reaction temperature is −90° C. to 200° C., preferably −20° C. to 100° C., and more preferably −10° C. to 50° C.

The reaction time is generally 0.05 hours to 200 hours, and preferably 0.5 hours to 100 hours.

The reaction can be performed under atmospheric pressure or increased pressure, and may be performed in a batch process or in a continuous process.

When the reaction is performed, a polymerization inhibitor may be added. As the polymerization inhibitor, BHT (2,6-di-tert-butyl-para-cresol), hydroquinone, paramethoxyphenol, or the like can be used, and any agent that inhibits polymerization of acrylic group or methacrylic group may be used without being limited.

Although the addition amount of the polymerization inhibitor to be added is not limited to a particular value, the addition amount is preferably 0.0001 wt % to 10 wt %, and preferably 0.01 wt % to 1 wt % with respect to total amount (mass) of the compound (X2-1) to be used. In the present specification, wt % means % by mass.

In the process of causing the intermediate (X2-2) to react with alcohol, a base may be added in order to suppress hydrolysis under acidic conditions. Examples of the base include pyridines such as pyridine and picoline; and tertiary amines such as trimethylamine, triethylamine, diisopropylethylamine, and tributylamine. Triethylamine and diisopropylethylamine are preferred, and triethylamine is more preferred. Although the addition amount of the base to be added is not limited to a particular value, the addition amount is preferably 0.01 equivalents to 2.0 equivalents, and more preferably 0.5 equivalents to 1.0 equivalent with respect to the addition amount of the trimethylsilyl chloride used during the reaction.

After the intermediate (X2-2) is obtained from the compound (X2-1), without isolating the intermediate (X2-2), alcohol may be added thereto for reaction.

Although the method for synthesizing the compound (X2-1) is not limited to a particular method, the compound (X2-1) can be produced by causing a (meth)acryloyloxyalkyl isocyanate to react with a polyol compound, or causing a hydroxyalkyl (meth)acrylate compound to react with a polyisocyanate compound.

Specific examples of the (meth)acryloyloxyalkyl isocyanate include 2-methacryloyloxyethyl isocyanate (trade name: Karenz MOI [registered trademark] manufactured by Showa Denko K.K.) and 2-acryloyloxyethyl isocyanate (trade name: Karenz AOI [registered trademark] manufactured by Showa Denko K.K.).

Specific examples of the polyol compound include a diol compound such as ethylene glycol, propylene glycol, 1,4-butanediol, 1,3-butanediol, 1,5-pentanediol, neopentylglycol, 3-methyl-1,5-pentanediol, 1,6-hexanediol, and 1,4-cyclohexane dimethanol; a triol compound such as glycerin and trimethylolpropane; pentaerythritol; dipentaerythritol; and diglycerine.

Specific examples of the hydroxyalkyl (meth)acrylate compound include a monomer having hydroxy group such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, diethylene glycol monoacrylate, diethylene glycol monomethacrylate, a poly(ethylene glycol)ethylether acrylate, and a poly(ethylene glycol)ethylether methacrylate.

Specific examples of the polyisocyanate compound include aliphatic diisocyanates such as hexamethylene diisocyanate, 2,4,4-trimethyl hexamethylene diisocyanate, and dimer acid diisocyanate; alicyclic diisocyanates such as isophorone diisocyanate, 4,4'-methylene bis(cyclohexyl isocyanate) and ω,ω'-diisocyanate dimethylcyclohexane; triisocyanates such as lysine ester triisocyanate, 1,6,11-undecane triisocyanate, 1,8-diisocyanate-4-isocyanate methyloctane, 1,3,6-hexamethylene triisocyanate, and bicycloheptane triisocyanate.

The (meth)acryloyloxyalkyl isocyanate compound, the polyol compound, the hydroxyalkyl (meth)acrylate compound, and the polyisocyanate compound are generally commercially available, and can also be synthesized by a known method.

In the retardation material-forming resin composition of the present invention, the component (E) may be a mixture of a plurality of compounds of the component (E).

When the cured film formed of the retardation material-forming resin composition of the present invention containing the component (E) is used as a liquid crystal alignment film, the compound of the component (E), such that adhesion between the liquid crystal alignment film (cured film) and a layer of polymerizable liquid crystal formed thereon is enhanced, can link a polymerizable functional group of the polymerizable liquid crystal with a cross-linking reaction moiety contained in the liquid crystal alignment film by covalent bonding. Consequently, the retardation material of the present embodiment that is formed by laminating the polymerizable liquid crystal cured on the orientation material of the present embodiment can retain excellent adhesion even under high-temperature and high-humidity conditions, and can have high durability against peeling or the like.

The content of the component (E) in the retardation material-forming resin composition of the present invention is preferably 0 part by mass to 80 parts by mass, and more preferably 0 part by mass to 50 parts by mass with respect to 100 parts by mass of the total amount of the resin of the component (A), the cross-linking agent of the component (B), the compound of the component (C), the cross-linking catalyst of the component (D), and the monomer of the component (F) described later. When the content of the component (E) is higher than 80 parts by mass, the photo-alignment properties and the solvent resistance of the cured film may deteriorate.

<Component (F)>

The retardation material-forming resin composition of the present invention may contain, as the component (F), a monomer having a photo-aligning group to which a thermally reactive moiety is bonded directly or connected via a linking group and one or more polymerizable groups.

When a cured film formed of the retardation material-forming resin composition of the present invention containing the monomer of the component (F) is used as an orientation material, this monomer enhances adhesion between the cured film and a layer of polymerizable liquid crystal formed and cured on the cured film, and thus functions as an adhesion-enhancing component.

The photo-aligning group to which a thermally reactive moiety is bonded directly or connected via a linking group in the monomer of the component (F) has been described in (supra).

The monomer of the component (F) is preferably a monomer having the photo-aligning group to which a thermally reactive moiety is bonded directly or connected via a linking group and a polymerizable group containing a C=C double bond.

The photo-aligning group to which a thermally reactive moiety is bonded directly or connected via a linking group is preferably an organic group including a structure of Formula (1):

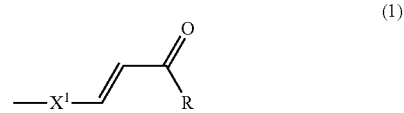

(in the Formula, R is a hydroxy group, an amino group, a hydroxyphenoxy group, a carboxyphenoxy group, an aminophenoxy group, an aminocarbonyl phenoxy group, a phenylamino group, a hydroxy phenylamino group, a carboxy phenylamino group, an amino phenylamino group, a hydroxy alkyl amino group, or a bis(hydroxyalkyl)amino group; and $X^1$ is a phenylene group that is optionally substituted with an optional substituent, in which a benzene ring in the definition of these substituents is optionally (supra).

The optional substituent has been described in (supra), and the substituent with which the benzene ring is optionally substituted has been described in (supra).

Among them, an organic group that includes a structure of Formula (1) in which R is a hydroxy group or an amino group, and X' is a phenylene group that is optionally substituted with an optional substituent is preferred.

Examples of the polymerizable group containing a C=C double bond include acrylic group, methacrylic group, vinyl group, an allyl group, and maleimide group.

Examples of the monomer of the component (F) include 4-(6-methacryloxyhexyl-1-oxy)cinnamic acid, 4-(3-methacryloxypropyl-1-oxy)cinnamic acid, and 4-(6-methacryloxyhexyl-1-oxy)cinnamamide.

The content of the component (F) in the retardation material-forming resin composition of the present invention is preferably 0 part by mass to 40 parts by mass, and more preferably 0 part by mass to 30 parts by mass with respect to 100 parts by mass of the resin of the component (A), the cross-linking agent of the component (B), the compound of the component (C), and the cross-linking catalyst of the component (D). When the content of the component (F) is higher than 40 parts by mass, the solvent resistance of the cured film may deteriorate.

<Solvent>

The retardation material-forming resin composition of the present invention is mainly used in a solution state of being dissolved in a solvent. The type, the structure, and the like of the solvent used herein are not limited as long as the solvent can dissolve the component (A) and the component (B), and if desired, the component (C), the component (D), the component (E), the component (F), and/or other additives described later.

Specific examples of the solvent include methanol, ethanol, n-propanol, isopropanol (2-propanol), n-butanol, isobutanol, n-pentanol, 2-methyl-1-butanol, ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, diethylene glycol, propylene glycol monomethyl ether, propylene glycol monomethyl ether acetate, propylene glycol monoethyl ether, propylene glycol propyl ether, propylene glycol propyl ether acetate, toluene, xylene, methyl ethyl ketone, cyclopentanone, cyclohexanone, 2-butanone, methyl isobutyl ketone, 3-methyl-2- pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, cyclopentyl methyl ether, N,N-dimethylformamide, N,N-dimethylacetamide, and N-methylpyrrolidone.

When a cured film is formed with the retardation material-forming resin composition of the present invention on a film to produce an orientation material, methanol, ethanol, isopropanol, n-propanol, n-butanol, 2-methyl-1-butanol, 2-heptanone, methyl isobutyl ketone, propylene glycol monomethyl ether, propylene glycol, diethylene glycol, and propylene glycol monomethyl ether acetate are preferred because the film exhibits resistance against these solvents.

These solvents may be used singly or in combination of two or more of them.

<Other Additives>

Furthermore, the retardation material-forming resin composition of the present invention may contain, as long as not impairing the effects of the present invention and if necessary, a sensitizer, an adhesion-enhancing agent, a silane coupling agent, a surfactant, a rheology adjusting agent, a pigment, a dye, a preservation stabilizer, an antifoamer, an antioxidant, and the like.

For example, the sensitizer is effective in promoting photoreaction after a thermally cured film is formed with the retardation material-forming resin composition of the present invention.

Examples of the sensitizer being one example of other additives include benzophenone, anthracene, anthraquinone, thioxanthone, derivatives thereof, and a nitrophenyl compound. Among them, a benzophenone derivative and a nitrophenyl compound are preferred. Specific examples of the preferred compound include N,N-diethylamino benzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, and 5-nitroindole. In particular, N,N-diethylamino benzophenone that is a derivative of benzophenone is preferred.

These sensitizers are not limited to those given above. The sensitizer may be used singly or in combination of two or more compounds.

The proportion of sensitizer to be used in the retardation material-forming resin composition of the present invention is preferably 0.1 parts by mass to 20 parts by mass, and more preferably 0.2 parts by mass to 10 parts by mass with respect to 100 parts by mass of the total mass of the component (A) to the component (F). When this proportion is excessively low, the effect as a sensitizer is not sufficiently obtained in some cases, and when the proportion is excessively high, decrease of the transmittance and roughening of the coating film may occur.

<Preparation of Retardation Material-Forming Resin Composition>

The retardation material-forming resin composition of the present invention contains a resin that is the component (A) and a cross-linking agent that is the component (B). In addition to the component (A) and the component (B), the retardation material-forming resin composition of the present invention may further contain: as the component (C), a compound having at least two groups A selected from the group consisting of hydroxy group, carboxy group, amide group, amino group, an alkoxysilyl group, and a group of Formula (2); a cross-linking catalyst as the component (D); as the component (E), a compound having one or more polymerizable groups and at least one group A selected from the group consisting of hydroxy group, carboxy group, amide group, amino group, an alkoxysilyl group, and a group of Formula (2), or one or more groups that react with the at least one group A; and as the component (F), a monomer having a photo-aligning group to which a thermally reactive moiety is bonded directly or connected via a linking group and one or more polymerizable groups. As long as the effects of the present invention are not impaired, the retardation material-forming resin composition of the present invention may contain other additives.

The blending ratio of the component (A) to the component (B) is preferably 20:80 to 100:0 in mass ratio. When the content of the component (B) is excessively high, the liquid crystal alignment properties are prone to deteriorate.

Preferred examples of the retardation material-forming resin composition of the present invention are listed below.

[1]: A retardation material-forming resin composition that contains the component (A).

[2]: A retardation material-forming resin composition that contains the component (C) at a content of 0 part by mass to 100 parts by mass based on 100 parts by mass of the component (A).

[3]: A retardation material-forming resin composition in which the blending ratio of the component (A) to the component (B) is 20:80 to 100:0 in mass ratio and that contains the component (C) at a content of 0 to 100 parts by mass based on 100 parts by mass of the total amount of the component (A) and the component (B).

[4]: A retardation material-forming resin composition that contains the component (C) at a content of 0 part by mass to 100 parts by mass based on 100 parts by mass of the total amount of the component (A) and the component (B), and a solvent.

[5]: A retardation material-forming resin composition that contains the component (C) at a content of 0 part by mass to 100 parts by mass and the component (D) at a content of 0 part by mass to 10 parts by mass based on 100 parts by mass of the total amount of the component (A) and the component (B), and a solvent.

[6]: A retardation material-forming resin composition that contains the component (C) at a content of 0 part by mass to 100 parts by mass, the component (D) at a content of 0 part by mass to 10 parts by mass, and the component (E) at a content of 0 part by mass to 50 parts by mass based on 100 parts by mass of the total amount of the component (A) and the component (B), and a solvent.

[7]: A retardation material-forming resin composition that contains the component (C) at a content of 0 part by mass to 100 parts by mass, the component (D) at a content of 0 part by mass to 10 parts by mass, the component (E) at a content of 0 part by mass to 50 parts by mass, and the component (F) at a content of 0 part by mass to 40 parts by mass based on 100 parts by mass of the total amount of the component (A) and the component (B), and a solvent.

The blending proportion, a preparation method, and the like, when the retardation material-forming resin composition of the present invention is used as a solution will be described below in detail.

The proportion of solid content in the retardation material-forming resin composition of the present invention is, but not limited to a particular proportion as long as each component is uniformly dissolved in a solvent, 1% by mass to 80% by mass, preferably 2% by mass to 60% by mass, and more preferably 3% by mass to 40% by mass. The solid content herein is a component remaining after excluding the solvent from the whole component of the retardation material-forming resin composition.

The preparation method of the retardation material-forming resin composition of the present invention is not limited to a particular method. Examples of the preparation method include a method in which the component (B), the component (C), the component (D), and further the component (E), and the component (F) and the like are mixed in a solution of the component (A) dissolved in a solvent at predetermined proportions, and in a method of making this solution uniform or in a certain step of this preparation method, other additives are further added therein if necessary, and the resulting solution is mixed.

In the preparation of the retardation material-forming resin composition of the present invention, a solution of the specific copolymer obtained by copolymerization reaction in the solvent can be used without being processed. In this case, for example, into a solution of the component (A), the component (B), the component (C), the component (D), the component (E), the component (F), and the like, are mixed in the same manner described above, and the resulting solution is made uniform. At this time, a solvent may be further added thereto for the purpose of adjusting the concentration. In this case, the solvent to be used in the process of preparing the component (A) may be the same as or may be different from the solvent to be used for adjusting the concentration of the retardation material-forming resin composition.

It is preferable that the solution of the retardation material-forming resin composition thus prepared be used after being filtered with a filter having a pore diameter of about 0.2 μm.

<Cured Film, Orientation Material, and Retardation Material>

A cured film can be formed as follows: the solution of the retardation material-forming resin composition of the present invention is applied onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate) or a film (for example, a resin film such as a triacetylcellulose (TAC) film, a cycloolefin polymer film, a poly ethylene terephthalate film, and an acrylic film), and the like, by bar coating, rotation coating, flow coating, roll coating, slit coating, slit coating followed by rotation coating, inkjet coating, printing, or the like, to form a coating; and then the resultant coating is heated and dried on a hot plate or in an oven.

As a condition for the heating and drying, it is preferable that cross-linking reaction with a cross-linking agent proceed in such a manner that a component of an orientation material to be formed of the cured film is not eluted into a polymerizable liquid crystal solution to be applied onto the orientation material. For example, a heating temperature and a heating time that are appropriately selected from a temperature range of 60° C. to 230° C. and a time range of 0.4 minutes to 60 minutes are used. The heating temperature and the heating time are preferably 70° C. to 230° C. and 0.5 minutes to 10 minutes.

The film thickness of the cured film to be formed of the retardation material-forming resin composition of the present invention is 0.05 μm to 5 μm, for example, which can be appropriately selected in consideration of level differences and the optical and electrical properties of a substrate to be used.

When irradiated with polarized UV light, the cured film thus formed can function as an orientation material, that is, a member in which a compound having liquid crystallinity including liquid crystals is aligned.

As a method for irradiation with polarized UV light, ultraviolet light to visible light having a wavelength of 150 nm to 450 nm are generally used, and the irradiation is performed by radiating linear polarized light in a vertical direction or an oblique direction at room temperature or in a heated state.

The orientation material formed of the retardation material-forming resin composition of the present invention has solvent resistance and heat resistance. Thus, after a retardation substance including a polymerizable liquid crystal solution is applied onto the orientation material, the retardation substance is heated up to the phase transition temperature of the liquid crystal, whereby the retardation substance is transformed into a liquid crystal state to be aligned on the orientation material. The retardation substance thus aligned is cured without being processed, whereby the retardation material as a layer having optical anisotropy can be formed.

As the retardation substance, for example, a liquid crystal monomer having a polymerizable group and a composition containing the liquid crystal monomer are used. When the substrate forming the orientation material is a film, the film having the retardation material of the present embodiment is useful as a retardation film. Some of such retardation substances for forming retardation materials are transformed into a liquid crystal state to be aligned in a state of horizontal alignment, cholesteric alignment, vertical alignment, hybrid alignment, or the like, on the orientation material, and thus can be used differently depending on the respective retardation required.

When a patterned retardation material to be used for a 3D display is produced, a cured film that is formed of the retardation material-forming resin composition of the present embodiment by the above-described method is irradiated with polarized UV light in a direction of +45 degrees, for example, from a predetermined reference through a line-and-space pattern mask, and the cured film is then irradiated with polarized UV light in a direction of −45 degrees after removing the mask. Thus, an orientation material is obtained in which two types of liquid crystal alignment regions are formed and the directions of alignment control of liquid crystals in the regions are different from each other. Subsequently, a retardation substance including a polymerizable liquid crystal solution is applied onto the orientation material, and is then heated up to the phase transition temperature of the liquid crystal. Thus, the retardation substance is transformed into a liquid crystal state and aligned on the orientation material. The retardation substance in which this alignment state is achieved is cured without being processed. Thus, the patterned retardation material can be obtained in which two types of retardation regions having different retardation properties are regularly aligned each in plurality.

Two substrates having orientation materials of the present invention, which have been formed as described above, are used, and the substrates are stuck together with a spacer interposed therebetween such that the orientation materials on the respective substrates face each other. Subsequently, a liquid crystal is injected between the substrates, whereby a liquid crystal display element in which the liquid crystal is aligned can be produced.

Thus, the retardation material-forming resin composition of the present invention can be suitably used for producing various retardation materials (retardation films) or liquid crystal display elements.

[Cured-Film Formation Composition]

The present invention also relates to a cured-film formation composition that contains a resin having the specific photo-aligning group as the component (A). In addition to the component (A), the cured-film formation composition of the present invention may contain a cross-linking agent as the component (B). Furthermore, in addition to the component (A) and the component (B), the cured-film formation composition of the present invention may further contain, as the component (C), a compound having at least two groups A selected from the group consisting of hydroxy group, carboxy group, amide group, amino group, an alkoxysilyl group, and a group of Formula (2):

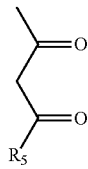
(2)

(in the Formula, $R_5$ is an alkyl group, an alkoxy group, or a phenyl group).

The cured-film formation composition of the present invention may contain other additives as long as the effects of the present invention are not impaired.

A preparation method and the like of the component (A) to the component (C) and the cured-film formation composition are the same as those of the retardation material-forming resin composition described above.

EXAMPLES

The present embodiment will be described in further detail with reference to Examples below. The present invention is, however, not limited to these Examples.

[Composition Components and Abbreviations Thereof to be Used in Examples, Etc.]

The respective composition components to be used in Examples and Comparative Examples below are as follows.

<Component (A), Component (B), Component (C): Polymer Raw Material>

M6CA: 4-(6-methacryloxyhexyl-1-oxy)cinnamic acid
M3CA: 4-(3-methacryloxypropyl-1-oxy)cinnamic acid
M6CAm: 4-(6-methacryloxyhexyl-1-oxy)cinnamamide
HEMA: 2-hydroxyethyl methacrylate
MAA: methacrylic acid
MMA: methyl methacrylate
Karenz MOI-BM (registered trademark):
2-(0-(1'-methylpropylideneamino)carboxyamino)ethyl methacrylate (manufactured by Showa Denko K.K.)
BMAA: N-butoxymethyl acrylamide
St: styrene
EGAMA: ethylene glycol mono-acetoacetate monomethacrylate (2-acetoacetoxy ethyl methacrylate)

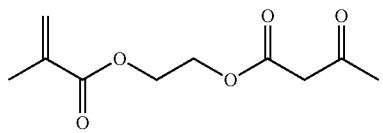

M100: CYCLOMER (registered trademark) M100 manufactured by Daicel Corporation

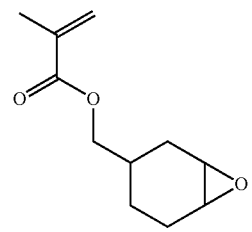

AIBN: α,α'-azobisisobutyronitrile
<Component (B): Cross-Linking Agent>
HMM: melamine cross-linking agent [CYMEL (registered trademark) 303 (manufactured by Mitsui Cytec Ltd.] of the structural formula:

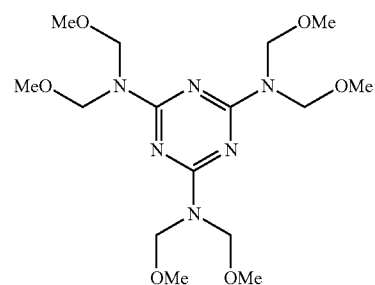 [SMILES: COCN(COC)c1nc(N(COC)COC)nc(N(COC)COC)n1]

TC-401: titanium tetraacetylacetonate (containing IPA [isopropanol] as a solvent at 35%) OLGATIX (registered trademark) TC-401 manufactured by Matsumoto Fine Chemical Co., Ltd.
<Component (D): Cross-Linking Catalyst Component>
PTSA: p-toluenesulfonic acid

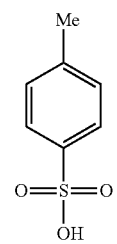

TPDA: tris(2,4-pentanedionato)-aluminum(III)
TPS: triphenyl silanol
TAG-2689: K-PURE (registered trademark) TAG2689 (manufactured by King Industries Inc.)
<Component (E): Adhesive Component>
80MFA: epoxyester 80MFA (manufactured by Kyoeisha Chemical Co., Ltd)
BMAA: N-butoxymethyl acrylamide

DM-1:

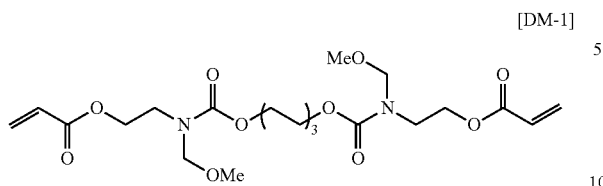

DM-2:

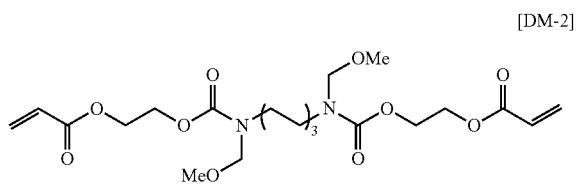

<Component (F): Adhesive Component>
M6CA: 4-(6-methacryloxyhexyl-1-oxy)cinnamic acid
<Solvent>
Each of the retardation material-forming resin compositions of Examples and Comparative Examples contains a solvent. As this solvent, propylene glycol monomethyl ether (PM) and isopropanol (IPA) were used.
<Measurement of Molecular Weight of Polymer>
The molecular weight of an acrylic copolymer in Polymerization Examples was measured with a Shodex (registered trademark) room-temperature gel permeation chromatography (GPC) apparatus (GPC-101) and a Shodex column (KD-803 and KD-805) as described below.
The number-average molecular weight (hereinafter, called Mn) and the weight-average molecular weight (hereinafter, called Mw) below were expressed as values in terms of polystyrene.
Column temperature: 50° C.
Eluant: N,N-dimethylformamide (30 mmol/L of lithium bromide-hydrate (LiBr.H$_2$O), 30 mmol/L of phosphoric acid.anhydride crystal (o-phosphoric acid), and 10 mL/L of tetrahydrofuran (THF) as additives)
Flow rate: 1.0 mL/min
Standard samples for preparing calibration curves: TSK standard polyethylene oxide (molecular weight: about 900,000, 150,000, 100,000, and 30,000) manufactured by Tosoh Corporation, and polyethylene glycol (molecular weight: about 12,000, 4,000, and 1,000) manufactured by Polymer Laboratories Ltd.
<Measurement of $^1$H-NMR>
The analysis device and analysis conditions used for $^1$H-NMR analysis are as follows.
Nuclear magnetic resonance apparatus: Varian NMR System 400 NB (400 MHz)
Measurement solvent: CDCl$_3$
Reference material: tetramethylsilane (TMS) (80.0 ppm for $^1$H)

Polymerization Example 1

4.0 g of M6CA, 4.0 g of MMA, 2.0 g of HEMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P1). Mn and Mw of the obtained acrylic copolymer were 9,300 and 29,000, respectively.

Polymerization Example 2

9.0 g of M6CA, 1.0 g of HEMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P2). Mn and Mw of the obtained acrylic copolymer were 14,000 and 33,000, respectively.

Polymerization Example 3

7.0 g of M6CA, 3.0 g of HEMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P3). Mn and Mw of the obtained acrylic copolymer were 12,000 and 26,200, respectively.

Polymerization Example 4

3.0 g of M6CA, 7.0 g of HEMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P4). Mn and Mw of the obtained acrylic copolymer were 14,100 and 28,600, respectively.

Polymerization Example 5

5.0 g of M3CA, 5.0 g of HEMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P5). Mn and Mw of the obtained acrylic copolymer were 10,800 and 34,900, respectively.

Polymerization Example 6

7.0 g of M6CA, 3.0 g of Karenz MOI-BM, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P6). Mn and Mw of the obtained acrylic copolymer were 13,000 and 43,000, respectively.

Polymerization Example 7

7.0 g of M6CAm, 3.0 g of HEMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P7). Mn and Mw of the obtained acrylic copolymer were 12,000 and 37,000, respectively.

Polymerization Example 8

7.0 g of MMA, 7.0 g of HEMA, 3.5 g of MAA, and 0.5 g of AIBN as a polymerization catalyst were dissolved in 53.9 g of PM, and the resultant solution was caused to react at 70° C. for 20 hours to obtain an acrylic copolymer solution (solid-content concentration: 25% by mass) (P8). Mn and Mw of the obtained acrylic copolymer were 10,300 and 24,600, respectively.

Polymerization Example 9

100.0 g of BMAA and 4.2 g of AIBN as a polymerization catalyst were dissolved in 193.5 g of PM, and the resultant solution was caused to react at 90° C. for 20 hours to obtain an acrylic polymer solution (solid-content concentration: 35% by mass) (P9). Mn and Mw of the obtained acrylic copolymer were 2,700 and 3,900, respectively.

Polymerization Example 10

5.0 g of M6CA, 5.0 g of MMA, and 0.5 g of AIBN as a polymerization catalyst were dissolved in 42.0 g of PM, and the resultant solution was caused to react at 80° C. for 20 hours to obtain an acrylic copolymer solution (solid-content concentration: 20% by mass) (P10). Mn and Mw of the obtained acrylic copolymer were 7,300 and 16,200, respectively.

Polymerization Example 11

4.0 g of M6CA, 4.0 g of St, 2.0 g of HEMA, and 0.1 g of AIBN as a polymerization catalyst were dissolved in 90.9 g of PM, and the resultant solution was caused to react at 80° C. for 20 hours to obtain an acrylic copolymer solution (solid-content concentration: 10% by mass) (P11). Mn and Mw of the obtained acrylic copolymer were 17,100 and 55,300, respectively.

Polymerization Example 12

9.0 g of MMA, 1.0 g of HEMA, and 0.1 g of AIBN as a polymerization catalyst were dissolved in 40.4 g of PM, and the resultant solution was caused to react at 80° C. for 20 hours to obtain an acrylic copolymer solution (solid-content concentration: 20% by mass) (P12). Mn and Mw of the obtained acrylic copolymer were 15,900 and 29,900, respectively.

Polymerization Example 13

6.0 g of M6CA, 4.0 g of EGAMA, and 0.3 g of AIBN as a polymerization catalyst were dissolved in 41.2 g of PM, and the resultant solution was caused to react at 80° C. for 20 hours to obtain an acrylic copolymer solution (solid-content concentration: 20% by mass) (P13). Mn and Mw of the obtained acrylic copolymer were 9,900 and 21,500, respectively.

Polymerization Example 14

7.0 g of M6CAm, 3.0 g of M100, and 0.3 g of AIBN as a polymerization catalyst were dissolved in 92.7 g of PM, and the resultant solution was caused to react at 80° C. for 20 hours to obtain an acrylic copolymer solution (solid-content concentration: 20% by mass) (P14). Mn and Mw of the obtained acrylic copolymer were 13,200 and 27,000, respectively.

Synthesis of Compound (E)

Synthesis Example 1

Synthesis of Compound [DM-1]

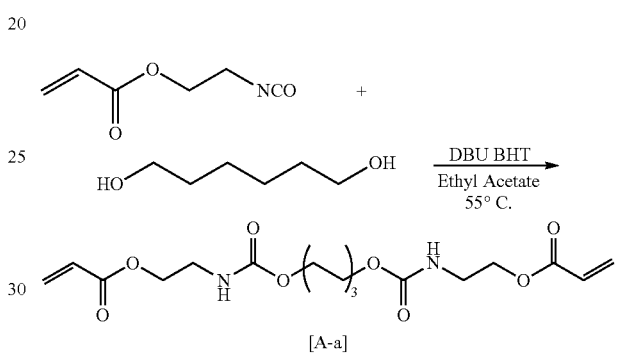

In a nitrogen gas stream, 500 g of ethyl acetate, 35.5 g (0.300 mol) of 1,6-hexanediol, 1.80 g (11.8 mmol) of 1,8-diazabicyclo[5.4.0]-7-undecene (DBU), and 0.45 g (2.04 mmol) of 2,6-di-tert-butyl-para-cresol (BHT) were put in a 2-L four-necked flask at room temperature. This mixture was heated up to 55° C. with stirring by a magnetic stirrer. Into this reaction solution, 95.9 g (0.679 mol) of 2-isocyanatoethyl acrylate was added dropwise. After being stirred for 2 hours, the reaction solution was analyzed by a high performance liquid chromatography. When the intermediate decreased to 1% or less in area percentage, the reaction was completed. 328 g of hexane was added into the resulting solution, and this mixture was cooled down to the room temperature. Subsequently, the precipitated solid was washed twice with 229 g of hexane and dried, and thus the compound [A-a] was obtained (104 g, 0.260 mol, yield 86.7%).

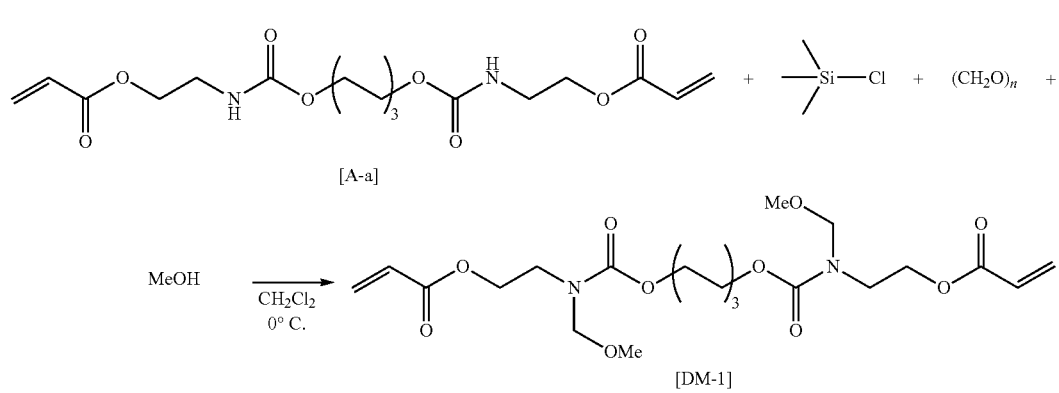

In a nitrogen gas stream, 1,330 g of dichloromethane, 100 g (0.250 mol) of the compound [A-a], and 22.5 g (0.749 mol) of paraformaldehyde were put in a 2-L four-necked flask. Into this mixture in an ice bath, 122 g (1.12 mol) of trimethylsilyl chloride was added dropwise. After the resulting solution was stirred for 2 hours, a mixed solution of 63.2 g (0.625 mol) of triethylamine and 240 g of methanol was added dropwise therein. The resulting solution was stirred for 30 minutes, and was then put in 5-L separatory funnel.

room temperature. This mixture was heated up to 60° C. with stirring by a magnetic stirrer. Into this reaction solution, a mixed solution of 12.8 g (111 mmol) of 2-hydroxyethyl acrylate and 26.0 g of toluene was added dropwise. The resulting solution was stirred for 1 hour, and was then stirred at room temperature for 24 hours. 131 g of hexane was added into the resulting solution, and this mixture was cooled in an ice bath. Subsequently, precipitated crystals were filtered and dried, and thus the compound [A-b] was obtained (15.0 g, 37.4 mmol, yield 74.8%).

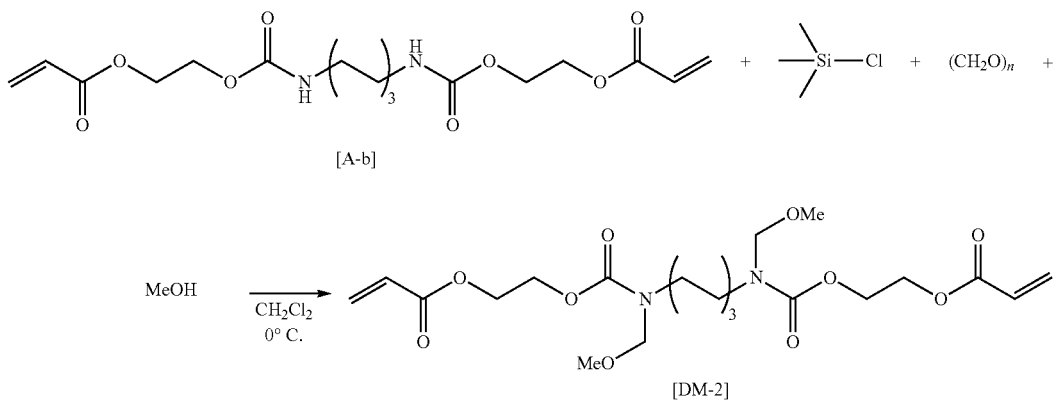

1,500 g of water was added therein, and liquid separation was performed. The obtained organic phase was dried with magnesium sulfate, filtrate obtained by removing the magnesium sulfate by filtration was concentrated and dried, and thus the compound [DM-1] was obtained (110 g, 0.226 mol, yield 90.3%). The structure of the compound [DM-1] was identified by the spectral data below obtained by $^1$H-NMR analysis.

$^1$H-NMR (CDCl$_3$): δ6.42 (d, 2H J=17.2), 6.17-6.08 (m, 2H), 5.86 (d, 2H J=10.0), 4.77 (d, 4H J=19.6), 4.30 (m, 4H), 4.12 (t, 4H J=6.4), 3.61 (m, 4H), 3.30 (d, 6H J=12.8), 1.67 (m, 4H), 1.40 (m, 4H)

Synthesis Example 2

Synthesis of Compound [DM-2]

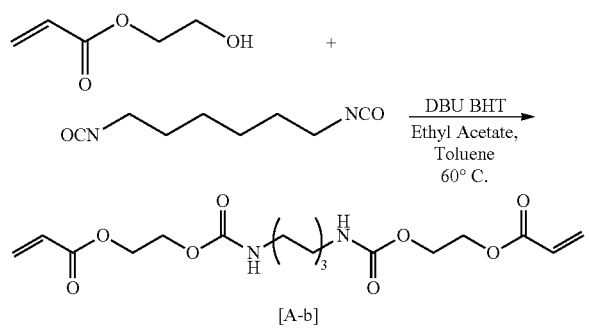

In a nitrogen gas stream, 35.0 g of ethyl acetate, 87.0 g of toluene, 8.41 g (50.0 mmol) of hexamethylene diisocyanate, 0.345 g (2.27 mmol) of 1,8-diazabicyclo[5.4.0]-7-undecene (DBU), and 70.0 mg (0.318 mmol) of 2,6-di-tert-butyl-para-cresol (BHT) were put in a 500-mL four-necked flask at In a nitrogen gas stream, 200 g of dichloromethane, 14.6 g (36.4 mmol) of the compound [A-b], and 3.28 g (109 mmol) of paraformaldehyde were put in a 300-mL four-necked flask. Into this mixture in an ice bath, 23.7 g (218 mmol) of trimethylsilyl chloride was added dropwise. After the resulting solution was stirred for 1 hour, 35.6 g of methanol was added dropwise therein and the solution was stirred for 1 hour. The organic phase was washed with 300 mL of saturated sodium hydrogencarbonate aqueous solution, and the obtained aqueous phase was further washed with 200 g of dichloromethane. A solution in which these two organic phases were mixed was further washed with 170 g of brine, and the organic phase obtained was dried with magnesium sulfate. The magnesium sulfate was removed by filtration, the dichloromethane solution obtained was concentrated and dried, and thus the [DM-2] as a target was obtained (16.2 g, 33.1 mmol, yield 91.0%). The structure of the compound [DM-2] was identified by the spectral data below obtained by $^1$H-NMR analysis.

$^1$H-NMR (CDCl$_3$): δ6.33 (d, 2H J=17.2), 6.20-6.14 (m, 2H), 5.96 (d, 2H J=10.4), 4.63 (s, 4H), 4.33 (m, 4H), 4.27 (m, 4H), 3.16-3.14 (br, 10H), 1.47 (m, 4H), 1.20 (m, 4H)

<Examples 1 to 22> and <Comparative Examples 1 to 4>

Each of retardation material-forming resin compositions of Examples 1 to 22 and Comparative Examples 1 to 4 was prepared according to the compositions given in Table 1. Subsequently, each of the retardation material-forming resin compositions was used to form a cured film, and the alignment properties of each cured film obtained were evaluated.

TABLE 1

| | Component (A) Alignment Polymer (g) | Component (B) Cross-Linking Agent (g) | Component (C) Containing Organic Group A (g) | Component (D) Cross-Linking Catalyst (g) | Component (D-2) Cross-Linking Catalyst (g) | Component (D-3) Cross-Linking Catalyst (g) | Component (E) Adhesive Component (g) | Component (F) Adhesive Component (g) | Solvent (g) |
|---|---|---|---|---|---|---|---|---|---|
| Example 1 | P1 1.87 | HMM 0.11 | | PTSA 0.015 | | | | | PGME 8.01 |
| Example 2 | P1 2.12 | HMM 0.06 | | PTSA 0.013 | | | | | PGME 7.81 |
| Example 3 | P2 1.87 | HMM 0.11 | | PTSA 0.015 | | | | | PGME 8.01 |
| Example 4 | P3 1.87 | HMM 0.11 | | PTSA 0.015 | | | | | PGME 8.01 |
| Example 5 | P4 1.87 | HMM 0.11 | | PTSA 0.015 | | | | | PGME 8.01 |
| Example 6 | P1 1.87 | P9 0.32 | | PTSA 0.015 | | | | | PGME 7.80 |
| Example 7 | P1 1.05 | HMM 0.06 | P8 0.84 | PTSA 0.015 | | | | | PGME 8.02 |
| Example 8 | P5 1.87 | HMM 0.11 | | PTSA 0.015 | | | | | PGME 8.01 |
| Example 9 | P6 2.50 | | | | | | | | PGME 7.50 |
| Example 10 | P7 1.87 | HMM 0.11 | | PTSA 0.015 | | | | | PGME 8.01 |
| Example 11 | P1 1.61 | HMM 0.10 | | PTSA 0.016 | | | BMAA 0.06 | | PGME 8.21 |
| Example 12 | P1 1.43 | HMM 0.14 | | PTSA 0.014 | | | 80MFA 0.06 | | PGME 8.36 |
| Example 13 | P6 2.08 | | P8 0.33 | | | | | | PGME 7.58 |
| Example 14 | P1 1.28 | HMM 0.13 | P8 0.20 | PTSA 0.015 | | | BMAA 0.05 | | PGME 8.33 |
| Example 15 | P1 1.10 | P9 0.25 | P8 0.35 | PTSA 0.018 | | | BMAA 0.04 | M6CA 0.04 | PGME 8.20 |
| Example 16 | P10 1.87 | HMM 0.11 | | PTSA 0.015 | | | | | PGME 8.01 |
| Example 17 | P11 2.11 | P9 0.31 | P12 0.21 | PTSA 0.015 | | | DM-1 0.13 | | PGME 7.19 |
| Example 18 | P11 2.11 | P9 0.31 | P12 0.21 | PTSA 0.015 | | | DM-2 0.13 | | PGME 7.19 |
| Example 19 | P13 1.87 | HMM 0.11 | | PTSA 0.015 | | | | | PGME 8.01 |
| Example 20 | P13 1.92 | TC-401 0.18 | | | | | | | PGME/IPA 7.87/0.03 |
| Example 21 | P14 3.33 | | | | TPDA 0.030 | TPS 0.130 | | | PGME 6.50 |
| Example 22 | P14 4.85 | | | TAF-2689 0.015 | | | | | PGME 5.13 |
| Comparative Example 1 | P2 2.50 | | | | | | | | PGME 7.50 |
| Comparative Example 2 | P3 2.50 | | | | | | | | PGME 7.50 |
| Comparative Example 3 | P7 2.50 | | | | | | | | PGME 7.50 |
| Comparative Example 4 | P10 2.50 | | | | | | | | PGME 7.50 |

[Evaluation of Alignment Properties]

A non-alkali glass was spin coated with each of the retardation material-forming resin compositions of Examples and Comparative Examples by a spin coater at 2000 rpm for 30 seconds, and then the resultant film was heated and dried on a hot plate at a temperature of 100° C. for 60 seconds to form a cured film. This cured film was vertically irradiated with linear polarized light of 313 nm at an exposure amount of 10 mJ/cm². A polymerizable liquid crystal solution RMS03-013C for horizontal alignment manufactured by Merck Ltd., Japan was applied onto the substrate thus irradiated by a spin coater, and then the resultant coating was prebaked on a hot plate at 60° C. for 60 seconds to form a coating film having a film thickness of 1.0 μm. This film was exposed at 300 mJ/cm² to prepare a retardation material. The retardation material on the prepared substrate was sandwiched between a pair of polarizing plates, and the emergence of retardation properties in the retardation material was observed. "○" for those in which retardation properties were found without failure, "Δ" for those in which retardation properties were found with failure, and "x" for those in which retardation properties were not found are listed in the column "Drying Condition 1". Those in which the results were "Δ" or "x" were heated and dried under heating and drying conditions for each of the retardation material-forming resin compositions at 100° C. for 60 seconds and then on a hot plate at 150° C. for 300 seconds, and the same evaluation as in the "Drying condition 1" was performed. The results are listed in the column "Drying Condition 2". Those in which the results were "Δ" or "x" in the "Drying Condition 2" were heated and dried under heating and drying conditions for each of the retardation material-forming resin compositions at 100° C. for 60 seconds and then on a hot plate at 200° C. for 300 seconds, and the same evaluation as in the "Drying condition 1" was performed. The results are listed in the column "Drying Condition 3".

[Evaluation Results]

The results of the evaluation performed are given in Table 2.

TABLE 2

| | Alignment Properties (10 mJ/cm²) | | |
|---|---|---|---|
| | Drying Condition 1 | Drying Condition 2 | Drying Condition 3 |
| Example 1 | ○ | | |
| Example 2 | ○ | | |
| Example 3 | ○ | | |
| Example 4 | ○ | | |
| Example 5 | ○ | | |
| Example 6 | ○ | | |
| Example 7 | ○ | | |
| Example 8 | ○ | | |
| Example 9 | X | X | ○ |
| Example 10 | Δ | ○ | |
| Example 11 | ○ | | |
| Example 12 | ○ | | |
| Example 13 | X | X | ○ |
| Example 14 | ○ | | |
| Example 15 | ○ | | |
| Example 16 | ○ | | |
| Example 17 | ○ | | |
| Example 18 | ○ | | |
| Example 19 | ○ | | |
| Example 20 | ○ | | |
| Example 21 | X | ○ | |
| Example 22 | X | ○ | |
| Comparative Example 1 | X | X | X |
| Comparative Example 2 | X | X | X |
| Comparative Example 3 | X | X | X |
| Comparative Example 4 | X | X | X |

In Examples 1 to 22, retardation materials were formed at a low exposure amount of 10 mJ/cm² by drying under a preferable drying condition. In Comparative Examples 1 to 4 in which the coating films did not have thermosetting properties, liquid crystal alignment properties were not obtained in any drying conditions, and liquid crystal alignment properties were not obtained even when the exposure amount was increased to 30 mJ/cm².

As described above, the retardation material-forming resin composition of the present invention is used to form a thermally cured film having photo-alignment properties, and contains a component having a photo-alignment moiety and a moiety for thermal cross-linking. A photo-aligning group is characterized by being a specific photo-aligning group, that is, a photo-aligning group to which a thermally reactive moiety is bonded directly or connected via a linking group. As for the specific photo-aligning group, for example, when the photo-aligning group is a cinnamic acid residue, the cinnamic acid residue has carboxy group that is a cross-linking group as a part of the residue. When a thermally cross-linking group forms a part of a photoreactive group in this manner also, the photoreactive group can be included in the specific photo-aligning group in the composition of the present invention.

In the present invention, any component in the composition needs to have, as the moiety for thermal cross-linking, both of a group A selected from the group consisting of hydroxy group, carboxy group, amide group, amino group, an alkoxysilyl group, and a group of Formula (2) and a group that reacts with the group A, or any component in the composition needs to have a moiety that self-crosslinks by heat.

Thus, the composition of the present invention contains a resin having the specific photo-aligning group as the component (A), that is, a photo-aligning group to which a thermally reactive moiety is bonded directly or connected via a linking group.

As one aspect of the present invention, examples include a composition that contains the resin having the specific photo-aligning group as the component (A) and, as the component (B), a cross-linking agent that reacts with the thermally reactive moiety connected to the specific photo-aligning group. In this case, the resin of the component (A) only needs to have, as a thermally reactive moiety, the thermally reactive moiety in the specific photo-aligning group, and this example corresponds to Example 16 that contains a copolymer of M6CA with MMA and a cross-linking agent.

As one aspect of the present invention, examples include a composition that further contains, as a thermally cross-linking system, a group that reacts with the thermally reactive moiety connected to the specific photo-aligning group in the resin of the component (A). This example corresponds to Examples 9 to 13, and Example 13 is an example further containing a copolymer having the group A.

A composition in which the resin of the component (A) is a copolymer with a monomer having the group A, and that contains, as the component (B), a cross-linking agent that thermally reacts with the group A is also preferred. This example corresponds to Examples 1 to 8, 10 to 12, 14, 15, and 17 to 20. Among them, Examples 7, 14, 15, 17, and 18 are examples further containing a copolymer having the group A, and Examples 11, 12, 14, 15, 17, and 18 are examples further having an adhesion-enhancing component.

As one aspect of the present invention, examples include a composition that further contains a self-crosslinking group as a thermally cross-linking system in the resin of the component (A). This example corresponds to Examples 21 and 22.

INDUSTRIAL APPLICABILITY

The retardation material-forming resin composition according to the present invention is very useful as a liquid crystal alignment film for a liquid crystal display element or an orientation material for forming an optically anisotropic film that is provided inside or outside the liquid crystal display element, and is particularly suitable as a material for forming a patterned retardation material for a 3D display. Furthermore, the retardation material-forming resin composition is suitable as a material for forming a cured film such as a protective film, a planarization film, and an insulation film in various displays such as a thin film transistor (TFT) liquid crystal display element and an organic EL element, particularly as a material for forming an interlayer insulation film of a TFT liquid crystal element, a protective film for a color filter, an insulation film of an organic EL element, or the like.

The invention claimed is:

1. A retardation material-forming resin composition being thermally curable and comprising a resin, component (A), having a photo-aligning group to which a thermally reactive moiety is bonded directly or connected via a linking group, wherein the photo-aligning group is an organic group including a structure of Formula (1):

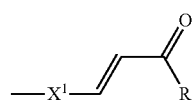

(1)

where R is an NH$_2$ group; and X$^1$ is a phenylene group that is optionally substituted with an optional substituent.

2. The retardation material-forming resin composition according to claim 1, wherein the resin of the component (A) is an acrylic copolymer.

3. The retardation material-forming resin composition according to claim 1, wherein the resin of the component (A) further has a self-crosslinking group, or further has a group that reacts with at least one group A selected from the group consisting of a hydroxy group, a carboxy group, an amide group, an amino group, an alkoxysilyl group, and a group of Formula (2), and when an end portion of the photo-aligning group in the resin is a carboxy group or an amide group, this end portion is also included in the group A, the group of Formula (2) having the structure:

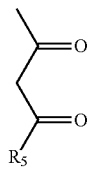

(2)

where R$_5$ is an alkyl group, an alkoxy group, or a phenyl group.

4. The retardation material-forming resin composition according to claim 1, wherein the resin of the component (A) further has at least one group A selected from the group consisting of a hydroxy group, a carboxy group, an amide group, an amino group, an alkoxysilyl group, and a group of Formula (2), and when an end portion of the photo-aligning group in the resin is a carboxy group or an amide group, this end portion is also included in the group A, and the composition further includes a cross-linking agent that reacts with the at least one group A, the group of Formula (2) having the structure:

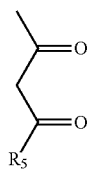

(2)

where R$_5$ is an alkyl group, an alkoxy group, or a phenyl group.

5. The retardation material-forming resin composition according to claim 1, wherein the resin of the component (A) further has a group that reacts with at least one group A selected from the group consisting of a hydroxy group, a carboxy group, an amide group, an amino group, an alkoxysilyl group, and a group of Formula (2), and when an end portion of the photo-aligning group in the resin is a carboxy group or an amide group, this end portion is also included in the group A, and the group of Formula (2) having the structure:

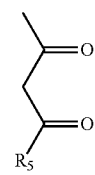

(2)

where R$_5$ is an alkyl group, an alkoxy group, or a phenyl group.

6. The retardation material-forming resin composition according to claim 1, further comprising a compound having at least two groups A selected from the group consisting of a hydroxy group, a carboxy group, an amide group, an amino group, an alkoxysilyl group, and a group of Formula (2), the group of Formula (2) having the structure:

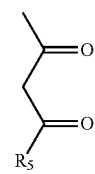

(2)

where R$_5$ is an alkyl group, an alkoxy group, or a phenyl group.

7. The retardation material-forming resin composition according to claim 1, further comprising a cross-linking catalyst.

8. The retardation material-forming resin composition according to claim 1, further comprising:
a compound having one or more polymerizable groups and at least one group A selected from the group consisting of a hydroxy group, a carboxy group, an amide group, an amino group, an alkoxysilyl group, and a group of Formula (2), or one or more groups that react with the at least one group A, the group of Formula (2) having the structure:

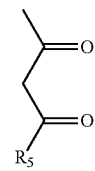

(2)

where R$_5$ is an alkyl group, an alkoxy group, or a phenyl group.

9. The retardation material-forming resin composition according to claim 1, further comprising a monomer having the photo-aligning group to which a thermally reactive moiety is bonded directly or connected via a linking group and one or more polymerizable groups.

10. An orientation material being obtained with the retardation material-forming resin composition as claimed in claim 1.

11. A retardation material being formed of a cured film that is obtained from the retardation material-forming resin composition as claimed in claim 1.

12. A thermally cured-film formation composition comprising a resin, component (A), having a photo-aligning group to which a thermally reactive moiety is bonded directly or connected via a linking group,
wherein the photo-aligning group is an organic group including a structure of Formula (1):

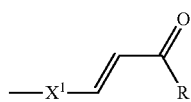
(1)

where R is an $NH_2$ group; and $X^1$ is a phenylene group that is optionally substituted with an optional substituent.

13. The thermally cured-film formation composition according to claim 12, wherein the resin of the component (A) is an acrylic copolymer.

14. The thermally cured-film formation composition according to claim 12, wherein the resin of the component (A) further has a self-crosslinking group, or further has a group that reacts with at least one group A selected from the group consisting of a hydroxy group, a carboxy group, an amide group, an amino group, an alkoxysilyl group, and a group of Formula (2) and when an end portion of the photo-aligning group in the resin is a carboxy group or an amide group, this end portion is also included in the group A, the group of Formula (2) having the structure:

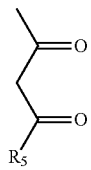
(2)

where in the Formula, $R_5$ is an alkyl group, an alkoxy group, or a phenyl group.

15. The thermally cured-film formation composition according to claim 12, wherein the resin of the component (A) further has at least one of group A selected from the group consisting of a hydroxy group, a carboxy group, an amide group, an amino group, an alkoxysilyl group, and a group of Formula (2), and when an end portion of the photo-aligning group in the resin is a carboxy group or an amide group, this end portion is also included in the group A, and the composition further includes a cross-linking agent that reacts with the at least one group A, the group of Formula (2) having the structure:

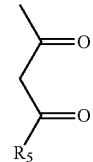
(2)

where $R_5$ is an alkyl group, an alkoxy group, or a phenyl group.

16. The thermally cured-film formation composition according to claim 12, wherein the resin of the component (A) further has a group that reacts with at least one group A selected from the group consisting of a hydroxy group, a carboxy group, an amide group, an amino group, an alkoxysilyl group, and a group of Formula (2), and when an end portion of the photo-aligning group in the resin is a carboxy group or an amide group, this end portion is also included in the group A, the group of Formula (2) having the structure:

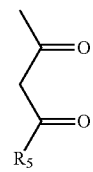
(2)

where $R_5$ is an alkyl group, an alkoxy group, or a phenyl group.

17. The thermally cured-film formation composition according to claim 12, further comprising a compound having at least two groups A selected from the group consisting of a hydroxy group, a carboxy group, an amide group, an amino group, an alkoxysilyl group, and a group of Formula (2), the group of Formula (2) having the structure:

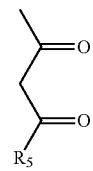
(2)

where $R_5$ is an alkyl group, an alkoxy group, or a phenyl group.

18. A cured film being obtained with the thermally cured-film formation composition as claimed in claim 12.

* * * * *